United States Patent
Li et al.

(10) Patent No.: US 9,380,582 B2
(45) Date of Patent: Jun. 28, 2016

(54) METHODS AND APPARATUS FOR FLEXIBLE BEAM COMMUNICATIONS IN RANDOM ACCESS IN SYSTEM WITH LARGE NUMBER OF ANTENNAS

(71) Applicant: Samsung Electronics Co., Ltd., Suwon-si, Gyeonggi-do (KR)

(72) Inventors: Ying Li, Richardson, TX (US); Zhouyue Pi, Allen, TX (US); Pavan Nuggehalli, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 13/803,271

(22) Filed: Mar. 14, 2013

(65) Prior Publication Data
US 2013/0272220 A1    Oct. 17, 2013

Related U.S. Application Data

(60) Provisional application No. 61/624,872, filed on Apr. 16, 2012.

(51) Int. Cl.
*H04W 72/04*     (2009.01)
*H04W 52/02*     (2009.01)
(Continued)

(52) U.S. Cl.
CPC ........... *H04W 72/046* (2013.01); *H04B 7/0408* (2013.01); *H04B 7/0413* (2013.01);
(Continued)

(58) Field of Classification Search
CPC . H04W 74/0833; H04W 72/02; H04W 16/28; H04W 72/0413; H04W 72/046; H04W 72/0446; H04W 72/08; H04W 74/08; H04W 48/12; H04W 72/085; H04W 72/042; H04W 74/0866; H04W 28/18; H04W 88/02; H04W 52/0229; H04W 52/0219; H04W 74/006; H04B 17/12; H04B 7/0408; H04B 7/0417; H04B 7/0413; H04B 7/0632; H04B 7/0617; H04B 7/0848; H04L 27/2647; H04L 5/0037; Y02B 60/50
USPC .......... 370/329, 336, 252, 328, 210; 455/500, 455/562.1
See application file for complete search history.

(56) References Cited

U.S. PATENT DOCUMENTS 6,768,913 B1 *   7/2004   Molnar .............. H04B 7/18532
                                                              455/273
7,349,371 B2    3/2008   Schein et al.
(Continued)

FOREIGN PATENT DOCUMENTS

EP         2735105 A2   5/2014
WO   WO 2011/053993 A1   5/2011

OTHER PUBLICATIONS

International Search Report dated Jul. 25, 2013 in connection with International Patent Application No. PCT/KR2013/003138, 3 pages.
(Continued)

*Primary Examiner* — Edan Orgad
*Assistant Examiner* — Ivan O Latorre

(57) ABSTRACT

A mobile station performs a method for random access in a wireless network. The method includes receiving, from a base station, information regarding a configuration of at least one receive beam of the base station to receive a random access signal. The method also includes configuring at least one transmit beam for a transmission of the random access signal based on the configuration information from the base station. The method further includes transmitting the random access signal to the base station on the at least one transmit beam.

20 Claims, 17 Drawing Sheets

(51) Int. Cl.
*H04W 74/00* (2009.01)
*H04B 7/04* (2006.01)
*H04B 7/06* (2006.01)
*H04B 7/08* (2006.01)
*H04W 74/08* (2009.01)

(52) U.S. Cl.
CPC .......... *H04B 7/0617* (2013.01); *H04B 7/0848* (2013.01); *H04W 52/0219* (2013.01); *H04W 52/0229* (2013.01); *H04W 74/006* (2013.01); *H04W 74/0833* (2013.01); *Y02B 60/50* (2013.01)

(56) References Cited

U.S. PATENT DOCUMENTS

| | | | | |
|---|---|---|---|---|
| 2005/0111427 A1* | 5/2005 | Li | ............... | H04W 28/18 370/343 |
| 2007/0249402 A1* | 10/2007 | Dong et al. | ............... | 455/562.1 |
| 2008/0318606 A1* | 12/2008 | Tsutsui et al. | ............... | 455/500 |
| 2009/0170514 A1 | 7/2009 | Yokoyama | | |
| 2009/0175161 A1* | 7/2009 | Yi et al. | ............... | 370/210 |
| 2009/0280867 A1 | 11/2009 | Hovers et al. | | |
| 2010/0177725 A1* | 7/2010 | van Rensburg | ............... | 370/329 |
| 2010/0267341 A1* | 10/2010 | Bergel | ............... | H04B 7/0617 455/63.1 |
| 2010/0298015 A1* | 11/2010 | Medbo | ............... | H04B 7/0617 455/501 |
| 2011/0149856 A1 | 6/2011 | Son et al. | | |
| 2011/0268049 A1 | 11/2011 | Luo et al. | | |
| 2011/0274056 A1* | 11/2011 | Sampath | ............... | H04B 7/0695 370/329 |
| 2011/0292816 A1 | 12/2011 | Lee et al. | | |
| 2012/0020420 A1* | 1/2012 | Sakoda | ............... | H01Q 3/26 375/259 |
| 2012/0026987 A1* | 2/2012 | Jain et al. | ............... | 370/336 |
| 2012/0076039 A1* | 3/2012 | Kwon | ............... | H04B 7/0634 370/252 |
| 2013/0021952 A1 | 1/2013 | Jeong et al. | | |

OTHER PUBLICATIONS

Written Opinion of International Searching Authority dated Jul. 25, 2013 in connection with International Patent Application No. PCT/KR2013/003138, 6 pages.

Extended European Search Report dated Nov. 13, 2015 in connection with European Patent Application No. 13778783.4, 12 pages.

Erdem Ulukan, et al.; "Angular MAC: a framework for directional antennas in wireless mesh networks"; Wrieless Networks; 2008; pp. 259-275.

* cited by examiner

METHODS AND APPARATUS FOR FLEXIBLE BEAM COMMUNICATIONS IN RANDOM ACCESS IN SYSTEM WITH LARGE NUMBER OF ANTENNAS

CROSS-REFERENCE TO RELATED APPLICATION(S) AND CLAIM OF PRIORITY

The present application claims priority to U.S. Provisional Patent Application Ser. No. 61/624,872 filed Apr. 16, 2012, entitled "FLEXIBLE BEAM COMMUNICATIONS IN RANDOM ACCESS IN MILLIMETER WAVE COMMUNICATIONS". The content of the above-identified patent documents is incorporated herein by reference.

TECHNICAL FIELD

The present application relates generally to wireless communication and, more specifically, to a method and apparatus for flexible beam communications in random access in a system with a large number of antennas.

BACKGROUND

Wireless communication has been one of the most successful innovations in modern history. Recently, the number of subscribers to wireless communication services exceeded 5 billion and continues to grow quickly. The demand of wireless data traffic is rapidly increasing due to growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

A method for random access by a mobile station in a wireless network is provided. The method includes receiving, from a base station, information regarding a configuration of at least one receive beam of the base station to receive a random access signal. The method also includes configuring at least one transmit beam for a transmission of the random access signal based on the configuration information from the base station. The method further includes transmitting the random access signal to the base station on the at least one transmit beam.

An apparatus for use in a mobile station configured for random access in a wireless network is provided. The apparatus includes a processor configured to receive, from a base station, information regarding a configuration of at least one receive beam of the base station to receive a random access signal. The processor is also configured to configure at least one transmit beam for a transmission of the random access signal based on the configuration information from the base station. The processor is further configured to configure at least one transmit beam for a transmission of the random access signal based on the configuration information from the base station.

A method for random access by a base station in a wireless network is provided. The method includes transmitting, to a mobile station, information regarding a configuration of at least one receive beam of the base station to receive a random access signal. The method also includes receiving the random access signal from the mobile station on the at least one receive beam. The random access signal is transmitted from the mobile station on at least one transmit beam that was configured based on the receive beam configuration information from the base station.

An apparatus for use in a base station configured for random access in a wireless network is provided. The apparatus includes a processor configured to transmit, to a mobile station, information regarding a configuration of at least one receive beam of the base station to receive a random access signal, and receive the random access signal from the mobile station on the at least one receive beam. The random access signal is transmitted from the mobile station on at least one transmit beam that was configured based on the receive beam configuration information from the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
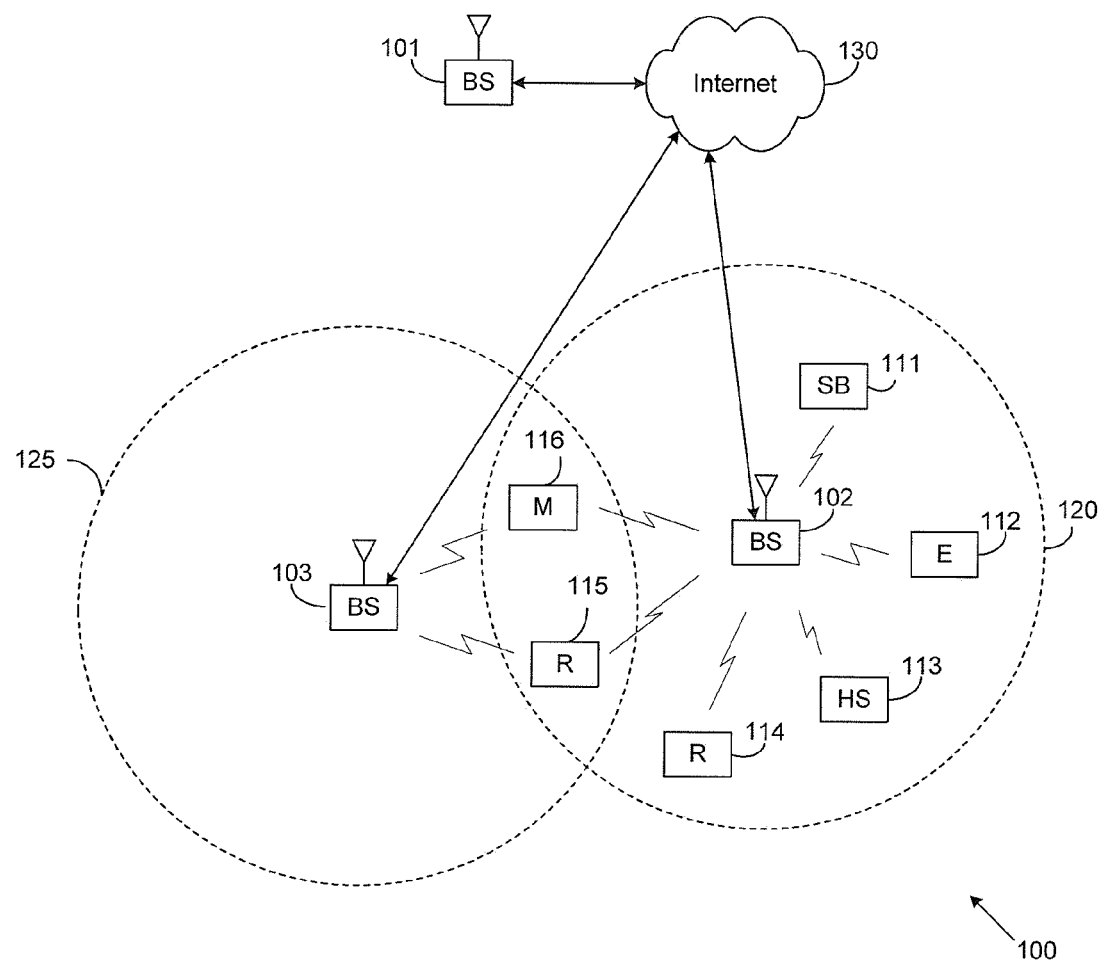
FIG. 1 illustrates a wireless communication network, according to embodiments of this disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Aspects, features, and advantages of the disclosure are readily apparent from the following detailed description, through illustration of a number of embodiments and implementations. The disclosure also encompasses other and different embodiments, and its several details can be modified in various obvious respects, all without departing from the spirit and scope of the disclosure.

In this disclosure, a limited number and types of base stations and mobile stations, service flows, connections, routes, or use cases may be used as examples for illustration. However, the embodiments disclosed herein are also applicable to other numbers and types of base stations, mobile stations, service flows, connections, routes, and other related use cases.

The following documents and standards descriptions are hereby incorporated into the present disclosure as if fully set forth herein: (i) F. Khan and Z. Pi., "MmWave Mobile Broadband (MMB): Unleashing the 3-300 GHz Spectrum", in Proc. Samoff Symposium, 2011 (hereinafter "REF1"); (ii) Z. Pi and F. Khan, "An Introduction To Millimeter-Wave Mobile Broadband Systems", IEEE Communication Magazine, June 2011 (hereinafter "REF2"); and (iii) Z. Pi and F. Khan, "System Design And Network Architecture For A Millimeter-Wave Mobile Broadband (MMB) System", in Proc. Samoff Symposium, 2011 (hereinafter "REF3").

The demand for wireless data traffic is rapidly increasing due to rising popularity among consumers and businesses of smart phones and other mobile data devices such as notepads, netbooks and eBook readers. In order to meet the high growth in mobile data traffic, improvements in radio interface efficiency and allocation of new spectrum is of paramount importance.

The current fourth generation wireless communication systems ("4G systems"), including LTE and Mobile WiMAX, use advanced technologies such as OFDM (Orthogonal Frequency Division Multiplexing), MIMO (Multiple Input Multiple Output), multi-user diversity, link adaptation, and the like, in order to achieve spectral efficiencies which are close to theoretical limits in terms of bps/Hz/cell. Continuous improvements in air-interface performance are being considered by introducing new techniques such as carrier aggregation, higher order MIMO, coordinated Multipoint (CoMP) transmission and relays, and the like. However, it is generally agreed that any further improvements in spectral efficiency will likely be marginal.

When spectral efficiency in terms of bps/Hz/cell cannot be improved significantly, another possibility to increase capacity is to deploy many smaller cells. However, the number of small cells that can be deployed in a geographic area can be limited due to costs involved for acquiring the new site, installing the equipment, provisioning backhaul, and so forth. In theory, to achieve a one-thousand-fold increase in capacity, the number of cells also needs to be increased by the same factor. Another drawback of very small cells is frequent handoffs which increase network signaling overhead and latency. Thus, while small cells may be a component of future wireless networks, the small cells alone are not expected to meet the capacity required to accommodate orders of magnitude increase in mobile data traffic demand in a cost effective manner.

In addition to the new technologies described above, more technologies are being explored to meet the explosive demand of mobile data. REF1, REF2, and REF3 discuss the use Millimeter-wave band (3-300 GHz spectrum) for Mobile Broadband (MMB) applications, with wide area coverage. Key advantages for these frequencies are spectrum availability and small component sizes such as antennas and other radio devices due to short wavelengths. Due to their smaller wave lengths, more millimeter wave antennas can be placed in a relative small area, thus enabling high-gain antenna in a small form factor. Larger bands can be used and higher throughput can be achieved using MMB communications compared to current 4G systems.

In certain cellular systems, a mobile station (MS) can detect a base station (BS) using one or more omni-receiving antennas or antennas with a very wide beam. These features permit the MS to easily listen to the downlink signal from the BS and detect the BS.

However, in certain newer systems with directional antennas or antenna arrays, such as an MMB cellular system, the receive beams can be narrow and receive beam forming may be required. One of the challenges is how to manage beams, especially when there are restraints on the beams. For example, some beams cannot be formed or used at the same time due to physical device constraints.

This disclosure describes solutions for having flexible beam communication in random access from mobile station to base station in a system with directional antennas or antenna arrays, where the mobile station can have different capabilities or different qualities of the communication channels, and the base station can also have different capabilities. In some embodiments, the disclosed methods are applicable to flexible beam communications in random access in millimeter wave communications.

Although embodiments of this disclosure are described in the context of communication with millimeter waves, the disclosed embodiments are also applicable in other communication mediums, e.g., radio waves with frequency of 3 GHz-30 GHz that exhibit properties similar to millimeter waves. In some cases, the disclosed embodiments are also applicable to electromagnetic waves with terahertz frequencies, infrared, visible light, and other optical media. For illustrative purposes, the terms "cellular band" and "millimeter wave band" are used herein, where "cellular band" refers to frequencies of approximately a few hundred megahertz to a few gigahertz, and "millimeter wave band" refers to frequencies of approximately a few tens of gigahertz to a few hundred gigahertz. One difference between the two is that the radio waves in cellular bands have less propagation loss and can provide superior coverage, but may require large antennas. On the other hand, radio waves in millimeter wave bands usually exhibit higher propagation loss but lend themselves well to high-gain antennas or antenna array designs in a small form factor.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The disclosure is illustrated by way of example, and not by way of limitation, in the figures of the accompanying drawings. In this disclosure, we use limited number and types of base stations or limited number of mobile stations or limited number of service flows or limited number of connections or limited number of routes or limited use cases as an example for illustration. However, the embodiments disclosed in this disclosure are also applicable to arbitrary number and types of base stations, arbitrary number of mobile stations, arbitrary number of service flows, arbitrary number of connections, and other related use cases.

As described above, millimeter waves typically refer to radio waves with wavelengths in the range of 1 mm-100 mm, which corresponds to a radio frequency of 3 GHz-300 GHz. As defined by ITU (International Telecommunications Union), these frequencies are also referred to as the EHF (Extremely High Frequency) band. These radio waves exhibit unique propagation characteristics. For example, compared with lower frequency radio waves, millimeter waves are often associated with higher propagation loss, have poorer ability to penetrate objects (e.g., buildings, walls, and foliage), and are more susceptible to atmosphere absorption, deflection and diffraction due to particles (e.g., rain drops) in the air. However, due to their smaller wavelengths, more millimeter wave antennas can be placed in a relatively small area, thus enabling high-gain antennas in a small form factor. In addition, due to the aforementioned perceived disadvantages, these radio waves have been less utilized than the lower frequency radio waves. Accordingly, spectrum in this band may be acquired at a lower cost.

The ITU defines frequencies in 3 GHz-30 GHz as SHF (Super High Frequency). The frequencies in the SHF band exhibit behavior similar to radio waves in the EHF band (i.e., millimeter waves), such as large propagation loss and the possibility of implementing high-gain antennas in small form factors.

Vast amounts of spectrum are available in the millimeter wave band. The millimeter wave band has been used, for example, in short range (within 10 meters) communications. However, the existing technologies in millimeter wave band are not optimized for commercial mobile communication having a wider coverage, so there is currently no significant commercial cellular system in millimeter wave band.

Throughout this disclosure, mobile broadband communication systems deployed in 3-300 GHz frequencies will be referred to as millimeter-wave mobile broadband (MMB).

One system design approach is to leverage the existing technologies for mobile communication and utilize the millimeter wave channel as additional spectrum for data communication. In such a system, communication stations (including different types of mobile stations, base stations, and relay stations) communicate using both cellular bands and millimeter wave bands. The cellular bands may be in the frequency of approximately a few hundred megahertz to a few gigahertz. Compared with millimeter waves, the radio waves in these frequencies may exhibit less propagation loss, can better penetrate obstacles, and are less sensitive to non-line-of-sight (NLOS) communication links or other impairments such as absorption by oxygen, rain, and other particles in the air. Therefore, it may be advantageous to transmit certain important control channel signals via the cellular radio frequencies, while utilizing the millimeter waves for high data rate communication.

In another system design approach, both stand-alone mobile communications and control/data communications may occur in MMB. The communications in MMB may coexist with current cellular systems (e.g., 4G, 3G, and the like). A mobile station can hand over to an existing 3G or 4G cellular system in situations where the mobile station is in a coverage "hole" in the MMB system, or the signal strength from the base stations in MMB is not strong enough. Base stations in MMB include different sizes with an overlay hierarchical network structure, where small cells can be overlaid by large cells.

In systems with directional antennas or antenna arrays, such as a MMB cellular system, one of the challenges is how to scan the cells, especially when there are system constraints, such as in systems where some beams cannot be formed or used at the same time due to physical device constraints. Embodiments of this disclosure address the issues of how to have flexible beam communication in random access from mobile station to base station in a system with directional antennas or antenna arrays, where the mobile station can have different capabilities or different qualities of the communication channels, and the base station can also have different capabilities. Although the example embodiments disclosed herein describe communications between base station and mobile station, it is noted that the disclosed embodiments are also applicable to communications between base station and base station.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station (SS) and the term user equipment (UE). The first plurality of subscriber stations includes subscriber station 111, which may be located in a small business (SB), subscriber station 112, which may be located in an enterprise (E), subscriber station 113, which may be located in a Wi-Fi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
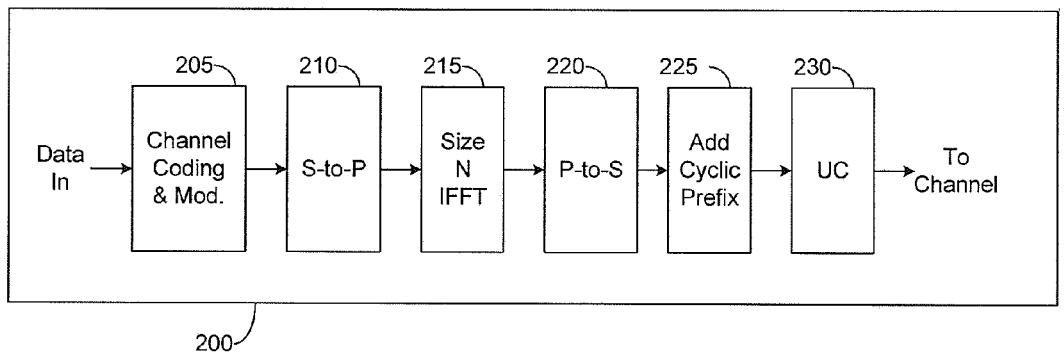
FIG. 2A is a high-level diagram of an orthogonal frequency division multiple access (OFDMA) or millimeter wave transmit path, according to embodiments of this disclosure.
Figure 2B:
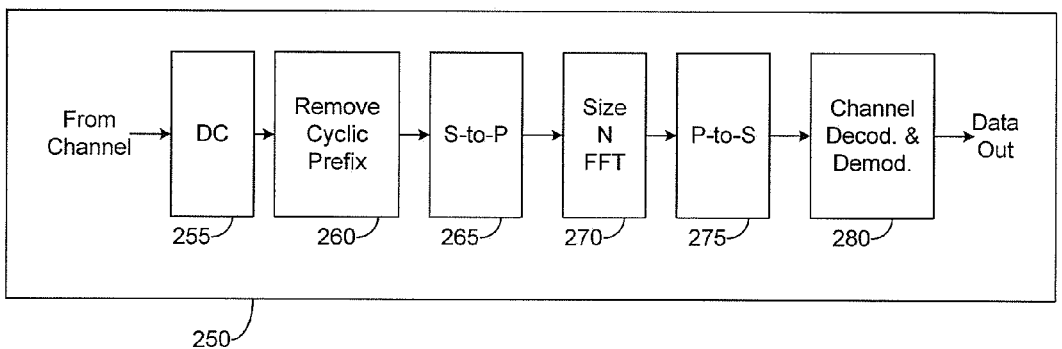
FIG. 2B is a high-level diagram of an OFDMA or millimeter wave receive path, according to embodiments of this disclosure.

FIG. 2A is a high-level diagram of an orthogonal frequency division multiple access (OFDMA) or millimeter wave transmit path, according to embodiments of this disclosure. FIG. 2B is a high-level diagram of an OFDMA or millimeter wave receive path, according to embodiments of this disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In an embodiment of this disclosure, a base station (BS) can have one or multiple cells, and each cell can have one or multiple antenna arrays, where each array within a cell can have different frame structures, e.g., different uplink and downlink ratios in a time division duplex (TDD) system.

Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted, e.g., in wide beams. A wide beam may include a single wide beam transmitted at one time, or a sweep of narrow beams at sequential times. Multicast and unicast data and control signals and messages can be transmitted, e.g., in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages, and broadcast data channels and control channels can be transmitted, e.g., in wide beams. Multicast and unicast data and control signals and messages can be transmitted, e.g., in narrow beams.

The beams can be in various shapes, or can have various beam patterns. The beam shapes or the beam patterns can be regular or irregular, e.g., pencil beam shape, cone beam shape, irregular main lobe with side lobes, and the like. The beams can be formed, transmitted, received, using, e.g., the transmit paths and the receive paths in FIGS. 3A through 3D.

Figure 3A:
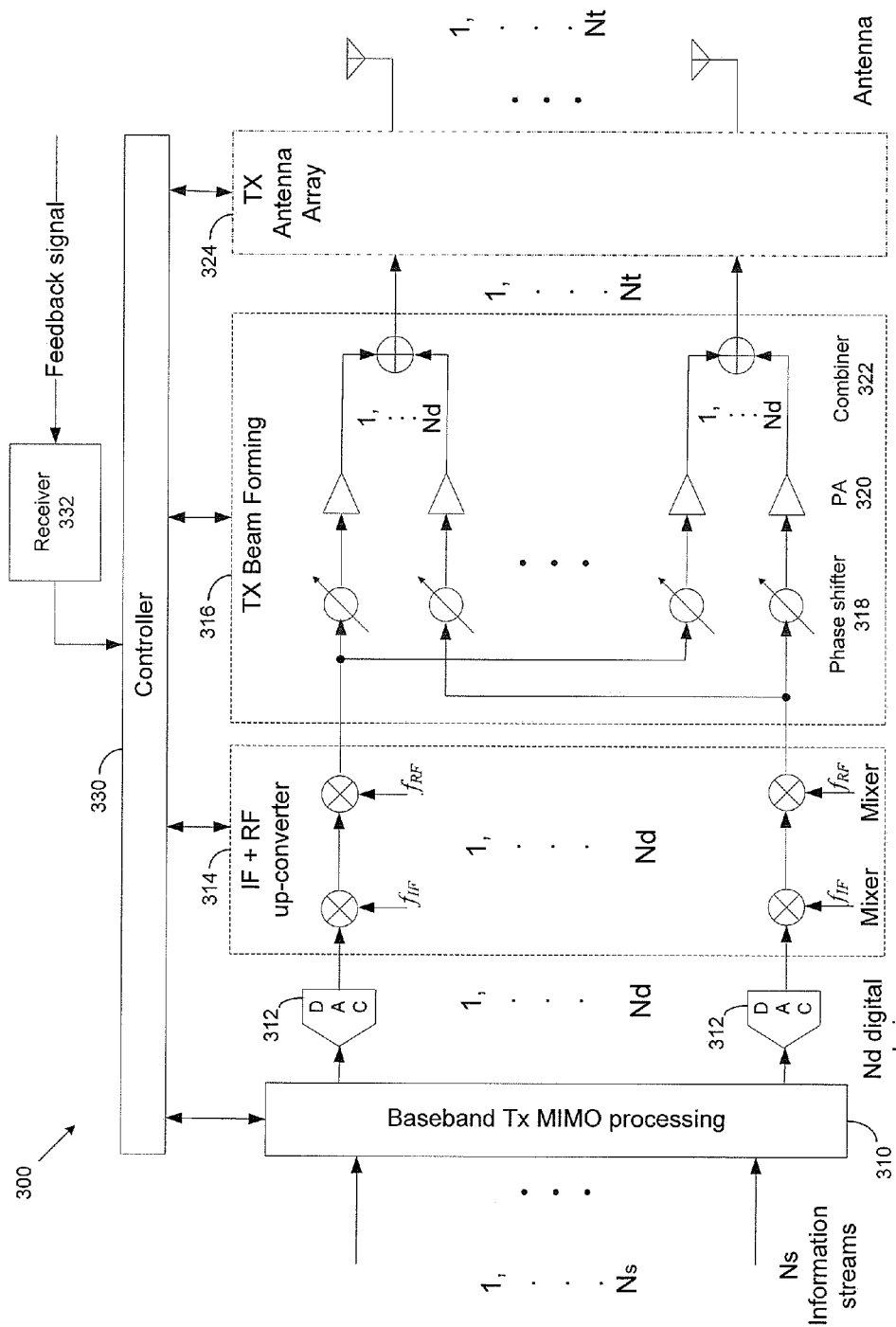
FIG. 3A illustrates a transmit path for multiple input multiple output (MIMO) baseband processing and analog beam forming with a large number of antennas, according to embodiments of this disclosure.

FIG. 3A illustrates a transmit path for multiple input multiple output (MIMO) baseband processing and analog beam forming with a large number of antennas, according to embodiments of this disclosure. The transmit path 300 includes a beam forming architecture in which all of the signals output from baseband processing are fully connected to all the phase shifters and power amplifiers (PAs) of the antenna array.

As shown in FIG. 3A, Ns information streams are processed by a baseband processor (not shown), and input to the baseband TX MIMO processing block 310. After the baseband TX MIMO processing, the information streams are converted at a digital and analog converter (DAC) 312, and further processed by an interim frequency (IF) and radio frequency (RF) up-converter 314, which converts the baseband signal to the signal in RF carrier band. In some embodiments, one information stream can be split to I (in-phase) and Q (quadrature) signals for modulation. After the IF and RF up-converter 314, the signals are input to a TX beam forming module 316.

FIG. 3A shows one possible architecture for the beam forming module 316, where the signals are fully connected to all the phase shifters and power amplifiers (PAs) of the transmit antennas. Each of the signals from the IF and RF up-converter 314 can go through one phase shifter 318 and one PA 320, and via a combiner 322, all the signals can be combined to contribute to one of the antennas of the TX antenna array 324. In FIG. 3A, there are Nt transmit antennas in the TX array 324. Each antenna can have one or multiple antenna elements. Each antenna transmits the signal over the air. A controller 330 can interact with the TX modules including the baseband processor, IF and RF up-converter 314, TX beam forming module 316, and TX antenna array module 324. A receiver module 332 can receive feedback signals and the feedback signals can be input to the controller 330. The controller 330 can process the feedback signal and adjust the TX modules.

Figure 3B:
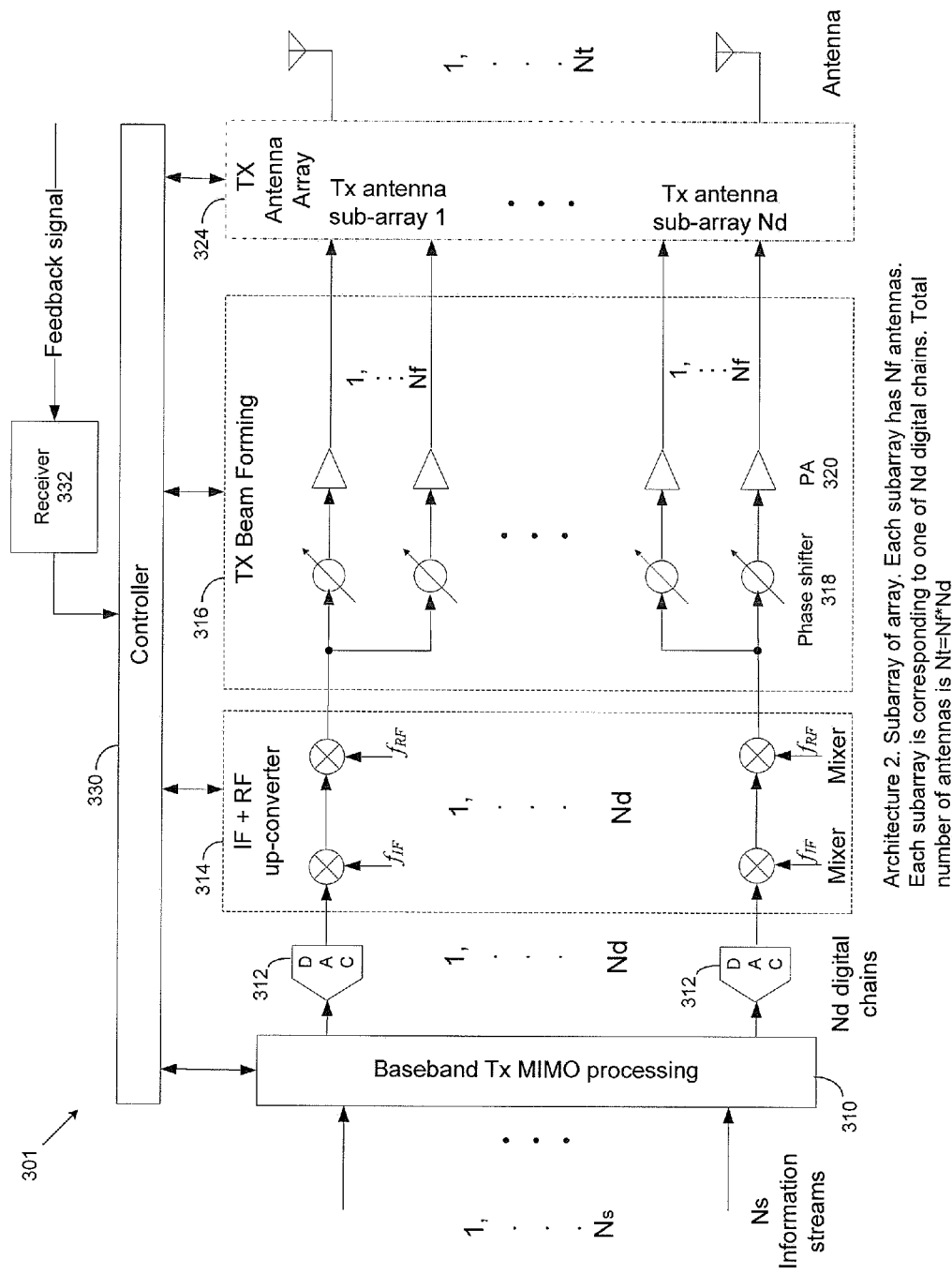
FIG. 3B illustrates another transmit path for MIMO baseband processing and analog beam forming with a large number of antennas, according to embodiments of this disclosure.

FIG. 3B illustrates another transmit path for MIMO baseband processing and analog beam forming with a large number of antennas, according to embodiments of this disclosure. The transmit path 301 includes a beam forming architecture in which a signal output from baseband processing is connected to the phase shifters and power amplifiers (PAs) of a sub-array of the antenna array. The transmit path 301 is similar to the transmit path 300 of FIG. 3A, except for differences in the beam forming module 316.

As shown in FIG. 3B, the signal from the baseband is processed through the IF and RF up-converter 314, and is input to the phase shifters 318 and power amplifiers 320 of a sub-array of the antenna array 324, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 301 includes an equal number of antennas for each sub-array. However, the disclosure is not limited thereto. Rather, the number of antennas for each sub-array need not be equal across all sub-arrays.

The transmit path 301 includes one output signal from the MIMO processing as the input to the RF processing with one sub-array of antennas. However, this disclosure is not limited thereto. Rather, one or multiple signals out of the Nd signals from base band processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 3A, or any type of the RF and IF signal processing with an array of antennas. The process related to one sub-array of the antennas may be referred to as one "RF chain".

Figure 3C:
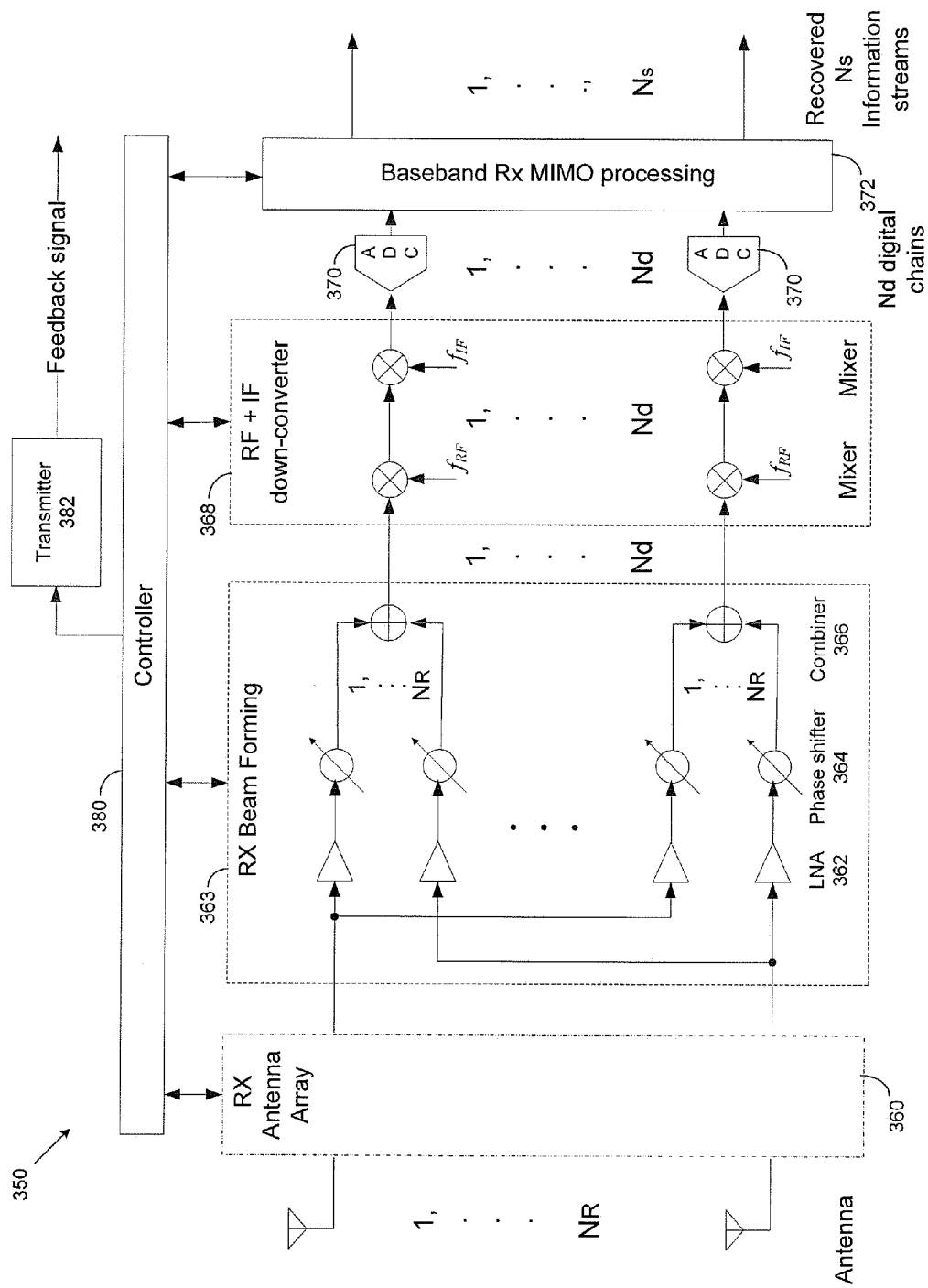
FIG. 3C illustrates a receive path for MIMO baseband processing and analog beam forming with a large number of antennas, according to embodiments of this disclosure.

FIG. 3C illustrates a receive path for MIMO baseband processing and analog beam forming with a large number of antennas, according to embodiments of this disclosure. The receive path 350 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 3C, NR receive antennas 360 receive the signals transmitted by the transmit antennas over the air. Each receive antenna can have one or multiple antenna elements. The signals from the RX antennas are processed through the LNAs 362 and the phase shifters 364. The signals are then combined at a combiner 366 to form an analog stream. In total, Nd analog streams can be formed. Each analog stream can be further converted to the baseband signal via a RF and IF down-converter 368 and an analog to digital converter (ADC) 370. The converted digital signals can be processed in a baseband RX MIMO processing module 372 and other baseband processing, to obtain the recovered NS information streams. A controller 380 can interact with the RX modules including baseband processor, RF and IF down-converter 368, RX beam forming module 363, and RX antenna array module 360. The controller 380 can send signals to a transmitter module 382, which can send a feedback signal. The controller 380 can adjust the RX modules and determine and form the feedback signal.

Figure 3D:
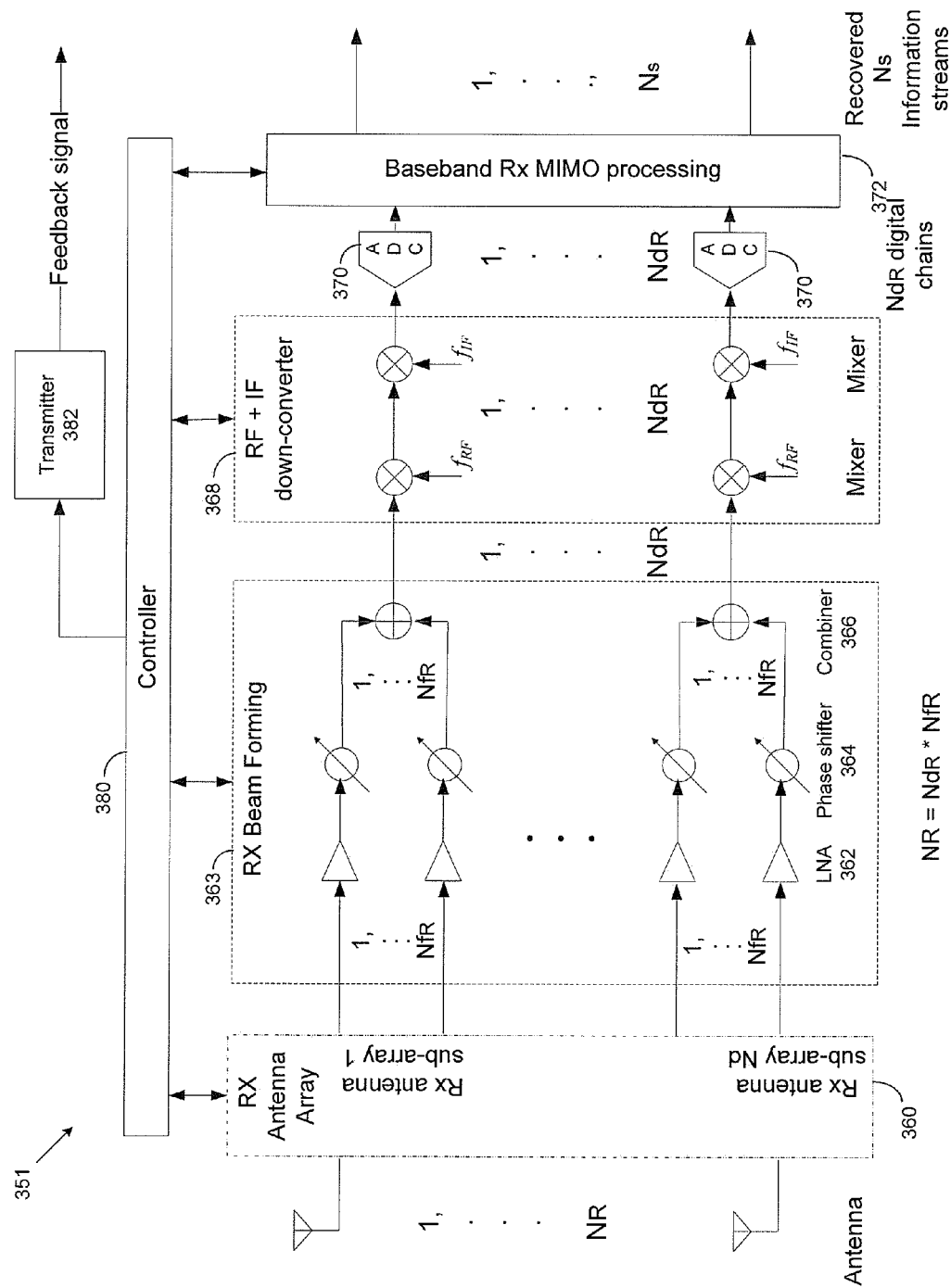
FIG. 3D illustrates another receive path for MIMO baseband processing and analog beam forming with a large number of antennas, according to embodiments of this disclosure.

FIG. 3D illustrates another receive path for MIMO baseband processing and analog beam forming with a large number of antennas, according to embodiments of this disclosure. The receive path 351 includes a beam forming architecture in which the signals received by a sub-array of the antenna array can be processed by amplifiers and phase shifters, to form an analog stream that can be converted and processed in the baseband. The receive path 351 is similar to the receive path 350 of FIG. 3C, except for differences in the beam forming module 363.

As shown in FIG. 3D, the signals received by NfR antennas of a sub-array of the antenna array 360 are processed by the LNAs 362 and phase shifters 364, and are combined at combiners 366 to form an analog stream. There can be NdR sub-arrays (NdR=NR/NFR), with each sub-array forming one analog stream. Hence, in total, NdR analog streams can be formed. Each analog stream can be converted to the baseband signal via a RF and IF down-converter 368 and an ADC 370. The NdR digital signals are processed in the baseband module 372 to recover the Ns information streams. The receive path 351 includes an equal number of antennas for each sub-array. However, the disclosure is not limited thereto. Rather, the number of antennas for each sub-array need not be equal across all sub-arrays.

The receive path 351 includes one output signal from the RF processing with one sub-array of antennas, as one of the inputs to the baseband processing. However, this disclosure is not limited thereto. Rather, one or multiple output signals from the RF processing with one sub-array of antennas, can be the inputs to the baseband processing. When multiple output signals from the RF processing with one sub-array of antennas are the inputs, each of the multiple output signals from the RF processing with one sub-array of antennas, can be connected to part of or all of the antennas of the said sub-array. For example, the RF and IF signal processing with each of the sub-array of antennas can be the same as the processing with the array of antennas as in FIG. 3C, or any type of the RF and IF signal processing with an array of antennas. The process related to one sub-array of the antennas can be referred to as one "RF chain".

In other embodiments, there can be other transmit and receive paths which are similar to the paths in FIGS. 3A through 3D, but with different beam forming structures. For example, the power amplifier 320 can be after the combiner 322, so the number of amplifiers can be reduced.

Figure 4:
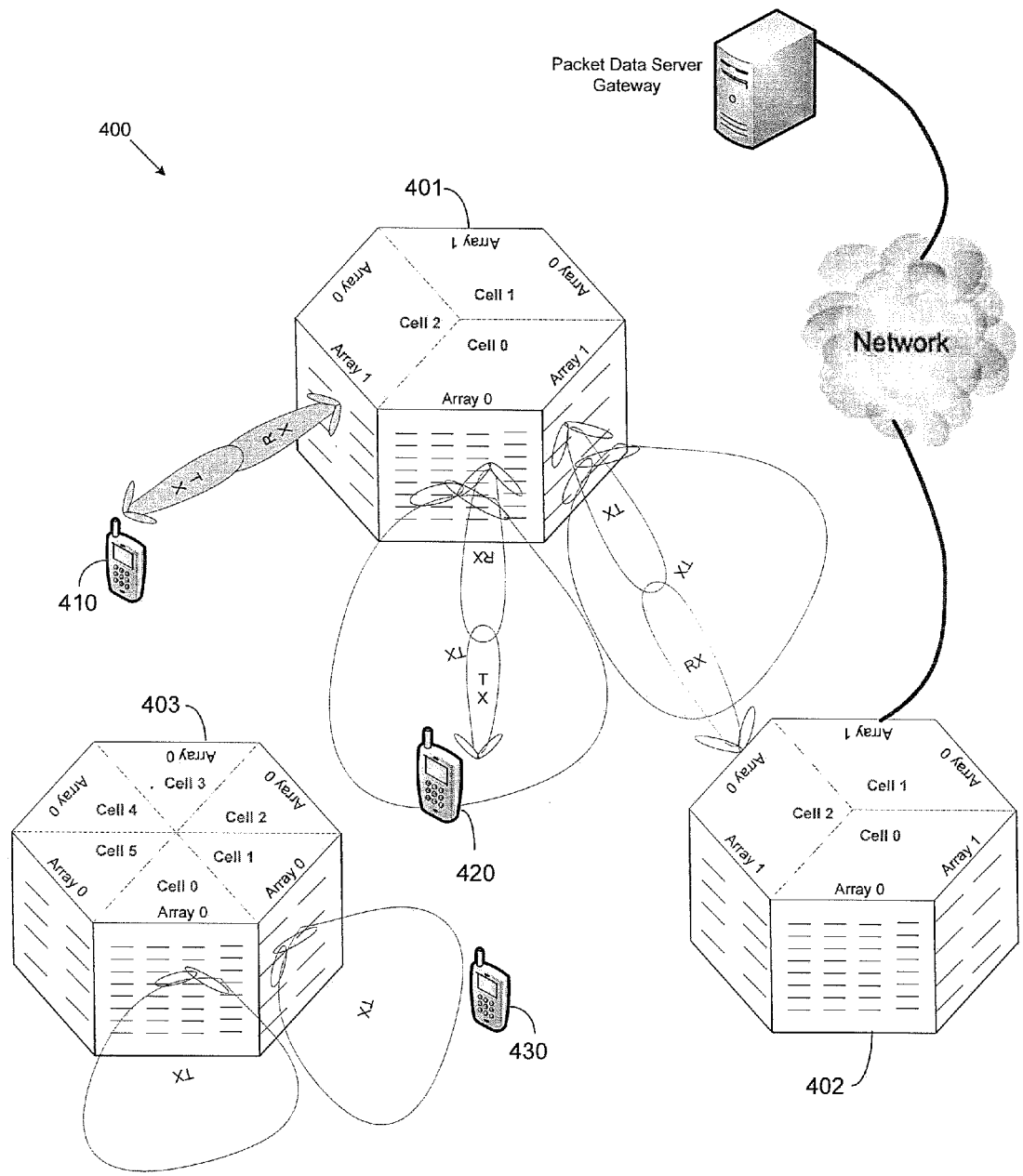
FIG. 4 illustrates a wireless communication system using antenna arrays, according to embodiments of this disclosure.

FIG. 4 illustrates a wireless communication system using antenna arrays, according to an embodiment of this disclosure. The embodiment of wireless communication system 400 illustrated in FIG. 4 is for illustration only. Other embodiments of the wireless communication system 400 could be used without departing from the scope of this disclosure.

As shown in FIG. 4, system 400 includes base stations 401-403 and mobile stations 410-430. Base stations 401-403 may represent one or more of base stations 101-103 of FIG. 1. Likewise, mobile stations 410-430 may represent one or more of subscriber stations 111-116 of FIG. 1.

BS 401 includes three cells, cell 0, cell 1, and cell 2. Each cell includes two arrays, array 0 and array 1. In cell 0 of BS 401, antenna array 0 and array 1 may transmit the same downlink control channels on a wide beam. However, array 0 can have a different frame structure from array 1. For example, array 0 can receive uplink unicast communication from MS 420, while array 1 can transmit downlink backhaul communication with cell 2 array 0 of BS 402. BS 402 includes a wired backhaul connecting to one or more backhaul networks. A synchronization channel (SCH) and broadcast channel (BCH) can also be transmitted over multiple beams with a beam width not as wide as the widest transmission beam from BS 401 shown in FIG. 4. Each of these multiple beams for the SCH or BCH may have a beam width wider than beams for unicast data communication, which can be for communication between a base station and a single mobile station.

Throughout the disclosure, the transmit beams can be formed by a transmit path such as shown in FIGS. 3A and 3B. Likewise, the receive beams can be formed by a receive path such as shown in FIGS. 3C and 3D.

One or more of the wireless links illustrated in FIG. 4 may be broken due to a LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere can be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search, a less than 180-degree elevation search may be sufficient.

In a sector or a cell, one or multiple arrays with one or multiple RF chains can generate beams in different shapes for different purposes. One RF chain can be for one or multiple antenna subarrays. One antenna subarray can form one or multiple beams.

Digital beamforming can be carried out on the baseband MIMO processing. Analog beam forming can be carried out by adjusting the phase shifter, the power amplifier (PA), or the low noise amplifier (LNA). Wide beams can be formed by analog beamforming, or both analog and digital beamforming. Narrow beams can be formed by both analog and digital beamforming.

Figure 5:
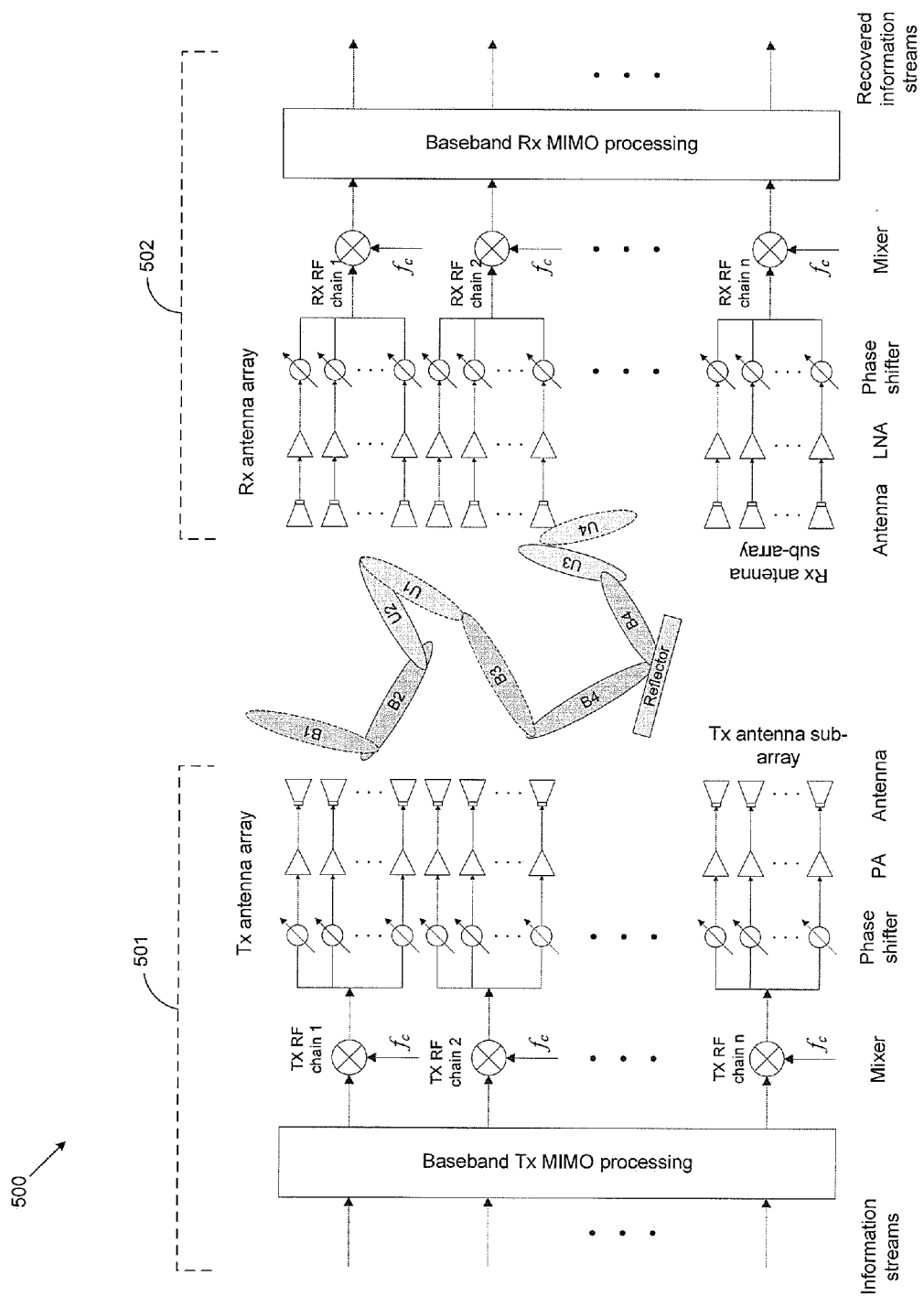
FIG. 5 illustrates an example of signal processing in a transmitter and a receiver in a millimeter wave system, according to an embodiment of this disclosure.

FIG. 5 illustrates an example of signal processing in a transmitter and a receiver in a millimeter wave system, according to an embodiment of this disclosure. The embodiment of millimeter wave system 500 illustrated in FIG. 5 is for illustration only. Other embodiments of millimeter wave system 500 could be used without departing from the scope of this disclosure.

In FIG. 5, millimeter wave system 500 includes a transmitter 501 and a receiver 502. Transmitter 501 may represent one or more of base stations 401-403 or mobile stations 410-430 of FIG. 4. Likewise, receiver 502 may represent one or more of base stations 401-403 or mobile stations 410-430. Transmitter 501 includes a plurality of transmit (TX) RF chains 1-$n$. Receiver 502 includes a plurality of receive (RX) RF chains 1-$n$. TX RF chain 1 forms beams B1 and B2. B1 and B2 can be formed by steering. That is, B1 and B2 are not concurrent beams, rather, they are formed one after another in the time domain. TX RF chain 2 forms beams B3 and B4. B3 and B4 can be formed by steering. RX RF chain 1 forms beams U1 and U2. U1 and U2 can be formed by steering. RX RF chain 2 forms beams U3 and U4. U3 and U4 can be formed by steering. As shown in FIG. 5, U2 can receive B2. U3 can receive B4 after B4 is reflected by a reflector. B3 can reach U1. Thus, there are three possible links (B2, U2), (B3, U1), (B4, U3). Because the beams from each RF chain are formed by steering, the three links (B2, U2), (B3, U1), (B4, U3) are not concurrent. Two possible concurrent connections are (B2, U2) and (B4, U3) as shown in FIG. 5.

In an embodiment, the base station or the network can send information to the mobile station, where the information can include the configuration or rule of the random access that the mobile station should follow. Alternatively, the information can include the parameters based on which mobile station can derive its TX configuration for random access signal transmitting, e.g., the configuration of the BS RX beams to receive the random access.

The mobile station sends a random access signal to the base station. The mobile station can select the number of MS TX beams (e.g., the good beams that can receive the downlink in good quality) and the beam width (wide or narrow, etc.). Based on the configuration of the BS RX beams to receive the random access, the mobile station can determine how to transmit the random access signal. This method can be applied to situations where the mobile station needs to send a random access signal to the base station, e.g., during the initial network entry (from power on to get into the network), or from the idle state to the connected state.

Figure 6:
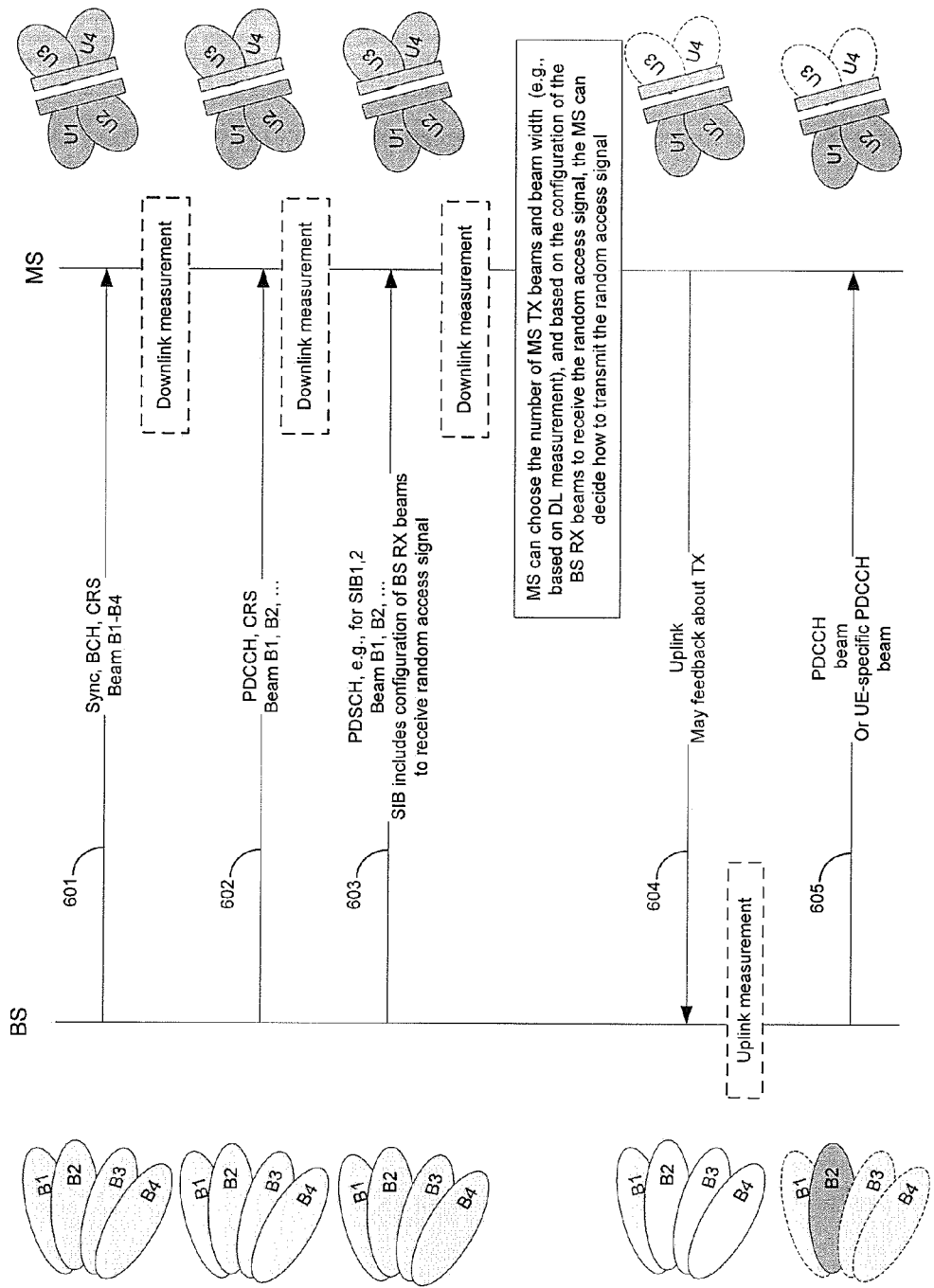
FIG. 6 shows an example of a process before random access and a number of initial steps of random access, according to an embodiment of this disclosure.

FIG. 6 shows an example of a process before random access and a number of initial steps of random access, according to an embodiment of this disclosure. The embodiment of process 600 illustrated in FIG. 6 is for illustration only. Other embodiments of process 600 could be used without departing from the scope of this disclosure.

In operation 601, the mobile station acquires the sync, broadcast channel (BCH), and cell specific reference signal (CRS), which can be sent over B1-B4 from the base station. In operation 602, the mobile station acquires the physical down link control channel (PDCCH) and cell specific reference signal (CRS), which can be sent over B1-B4 from the base station. In operation 603, the base station sends system information blocks (SIBs) to the mobile station, e.g., via the physical downlink shared channel (PDSCH). The mobile station decodes the SIBs. The SIB can include the configuration or rule of the random access that the mobile station should follow, e.g., the configuration of the BS RX beams to receive the random access.

In operation 604, the mobile station sends the random access signal to the base station. The mobile station can select the number of MS TX beams (e.g., the good beams that can receive the downlink in good quality) and the beam width (wide or narrow, etc.). Based on the configuration of the BS RX beams to receive the random access, the mobile station can determine how to transmit the random access signal. For example, if U1 and U2 receive strong signals at the downlink, by reciprocity, the mobile station may use U1 and U2 to transmit the random access signal at the uplink. If the BS RX beams are configured by steering, the mobile station should repeat the random access signal up to a number of times equal to the number of BS RX beams that are formed by steering. The mobile station can feed back about BS TX beams to the base station, e.g., a few strong or strongest BS TX beams. For example, the mobile station can feed back that B2 is the best beam. The base station can measure the uplink signal.

In operation 605, the base station selects B2 to send the PDCCH beam to the mobile station. The base station can use the same beam to send the PDSCH to the mobile station.

In an embodiment, the base station can steer the BS RX beams to receive the random access signal. The MS TX beam can hold for a certain direction while the BS RX beams are steered. Then, the MS TX beam moves to a next direction and holds, while the steering of the BS RX beams is repeated.

The base station sends the information about its configuration on BS RX beams to receive the random access signal to the mobile station, e.g., in SIB2. The information can include, e.g., the information shown in Table 1.

TABLE 1

An example of the information the BS sends to the MS about BS RX beams to receive random access signal

| Information | Notes |
| --- | --- |
| Number of BS RX beams that are formed by steering (P) | MS repeats the random access signal M times (M should be at least P) |
| Number of rounds that the BS RX beams steer (R) | For MS TX, the number of the beams that can be formed by steering at each RF chain (e.g., N/S) should be no greater than R, where N is the total number of MS TX beams, S is the number of RF chain |
| Timing information of the BS RX beams: the duration of each RX beam, or the duration of a round of steering (P beams), or the duration of R rounds of steering (P * R beam time) | The duration can be, e.g., in the unit of symbols |

The information can be also sent in other formats with alternative interpretations. For example, the information can include the requirements to the mobile station, rather than the base station's RX beam capability, such as shown in Table 2.

TABLE 2

An example of the information the BS sends to the MS about MS TX beams to send random access signal

| Information | Notes |
| --- | --- |
| Number of repetitions of MS random access signal (M) | MS repeats the random access signal M times |
| For MS TX, the maximum number of the beams that are formed by steering at each RF chain (R) | For MS TX, the number of the beams that can be formed by steering at each RF chain should be no greater than R |
| Timing information of the MS TX beams: the duration of each MS TX beam (with M repetitions), or the duration of each MS TX beam for one repetition | The duration can be, e.g., in the unit of symbols |

The mobile station can then determine the number of BS TX beams (e.g., the good beams that can receive the downlink in good quality) and beam width (e.g., narrow or wide, etc.). Based on the configuration of the BS RX beams to receive the random access, the mobile station can determine how to transmit the random access signal. The mobile station can make different choices flexibly based on its own situation, as long as the requirements are met. An example is shown in FIG. 7.

Figure 7:
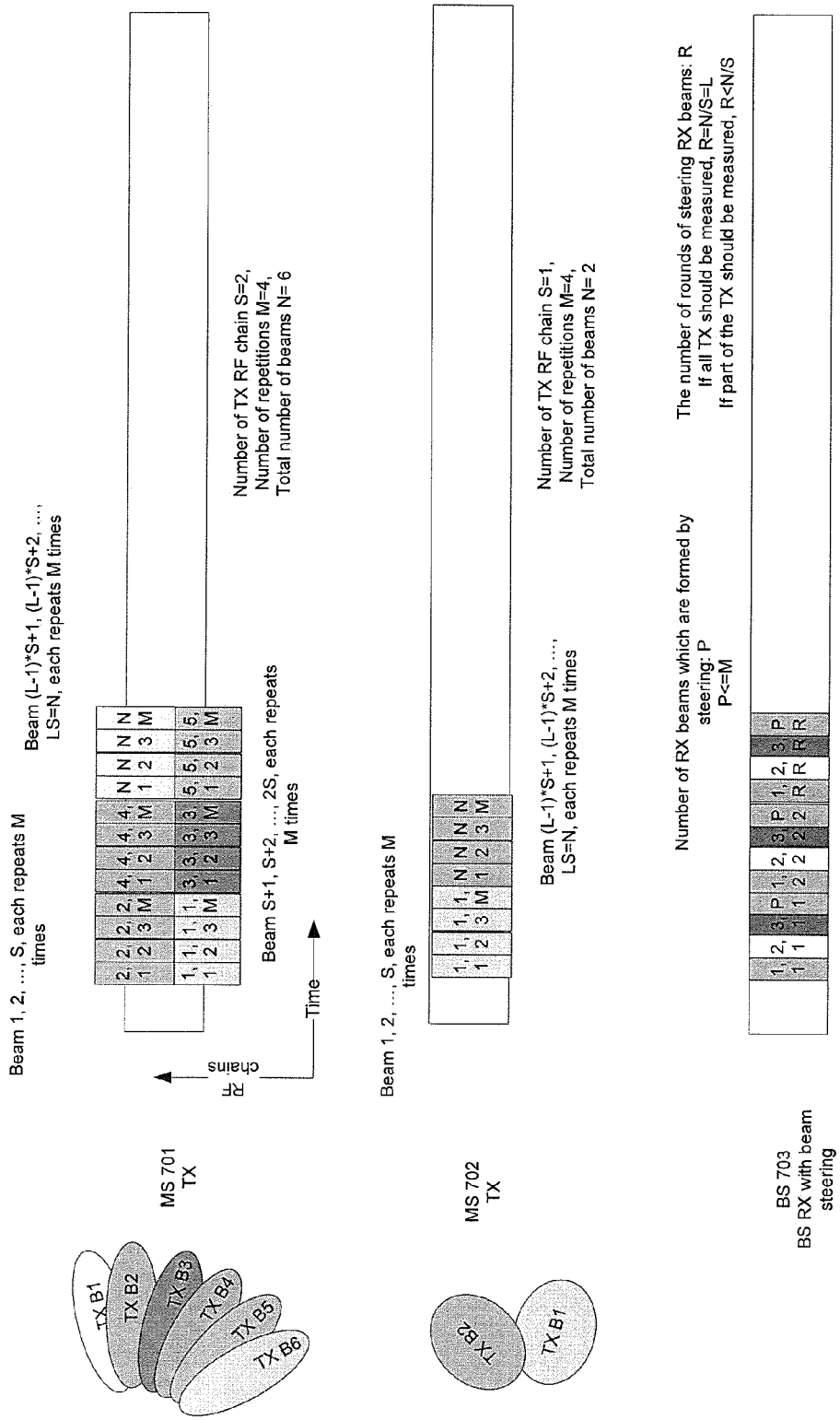
FIGS. 7-10 illustrate different mobile stations flexibly using different configurations for the random access signal, according to embodiments of this disclosure.

FIG. 7 illustrates different mobile stations flexibly using different configurations for the random access signal, according to an embodiment of this disclosure. The configurations illustrated in FIG. 7 are for illustration only. Other configurations could be used without departing from the scope of this disclosure.

FIG. 7 includes a plurality of mobile stations 701, 702 in communication with a base station 703. Base station 803 informs mobile stations 701, 702 about BS RX beam forming. As shown in FIG. 7, S indicates the number of TX RF chains, N indicates the total number of beams at each mobile station, and M indicates the number of repetitions. P indicates the number of RX beams that are formed by steering, and R indicates the number of rounds of steering the RX beams. In FIG. 7, P=4 and R=3.

If P (the number of RX beams that are formed by steering) is known at the TX, then the TX can determine M (the number of repetitions) as M=P. The number P may be signaled to the TX side, or derived, or preconfigured. The TX side's information about the number (N/S) of TX transmissions in time can be used for the RX side to determine R (the number of rounds of steering RX beams). Here, R=N/S. The number N/S may be signaled to the RX side, or derived, or preconfigured. Alternatively, R (the number of rounds of steering RX beams) can be configured. The number R can be sent to the TX. Then the TX can determine how many beams to use for TX. The total beams N used at TX should satisfy N/S<=R.

In FIG. 7, MS 701 has enough power and MS 701 does not have links with very high signal strength based on the downlink measurement. Thus, MS 701 determines to use narrow TX beams. If MS 701 determines to use 2 RF chains, then the maximum number of beams it can use is 3*2=6 beams, each chain with 3 beams because R=3.

MS 702 finds two strong links or two strong directions at the downlink. MS 702 uses these two strong directions for random access. MS 702 can use one RF chain, and steer the beams. Since MS2 only uses two beams, at the third round of the BS RX steering, there can be reduced interference to MS 701's link to the base station. MS 702 can also just use two narrow beams instead of two wide beams. MS 701 and MS 702 each repeat the signal at each direction or each beam four times.

Throughout this disclosure, the random access resources for multiple mobile stations (e.g., MS 701 and MS 702) may not necessarily be aligned in the time domain. When multiple mobile stations use random access resources in the time domain, the resources may be different in the frequency domain, to avoid colliding.

In an embodiment, the base station steers the BS RX beams to receive the random access signal. The base station sends the information about its configuration on BS RX beams to receive the random access signal to the mobile station, e.g., in SIB2. The base station can use multiple RF chains which can form beams concurrently (at the same time), then for each chain, the number of BS RX beams can be reduced. The information can include, e.g., the information shown in Table 3.

TABLE 3

An example of the information the BS sends to the MS about BS RX beams to receive random access signal

| Information | Notes |
|---|---|
| Number of BS RX beams that are formed by steering per RF chain (Z) | MS repeats the random access signal M times (M should be at least Z) |
| Number of rounds that the BS RX beams steer (R) | For MS, the number of the beams that can be formed by steering at each RF chain should be no greater than R |
| Timing information of the BS RX beams: the duration of each RX beam, or the duration of a round of steering (Z beams), or the duration of R rounds of steering (Z*R beam time) | The duration can be, e.g., in the unit of symbols |

The information can be also sent in other formats with alternative interpretations. For example, the information can include the requirements to the mobile station, rather than the base station's RX beam capability, such as shown in Table 4.

TABLE 4

An example of the information the BS sends to the MS about MS TX beams to send random access signal

| Information | Notes |
|---|---|
| Number of repetitions of MS random access signal (M) | MS repeats the random access signal M times |
| For MS TX, the maximum number of the beams that are formed by steering at each RF chain (R) | For MS TX, the number of the beams that can be formed by steering at each RF chain should be no greater than R |
| Timing information of the MS TX beams: the duration of each MS TX beam (with M repetitions), or the duration of each MS TX beam for one repetition | The duration can be, e.g., in the unit of symbols |

The mobile station can then determine the number of MS TX beams (e.g., the good beams that can receive the downlink in good quality) and beam width (e.g., narrow or wide, etc.). Based on the configuration of the BS RX beams to receive the random access, the mobile station can determine how to transmit the random access signal. The mobile station can make different choices flexibly based on its own situation, as long as the requirements are met. An example is shown in FIG. 8.

Figure 8:
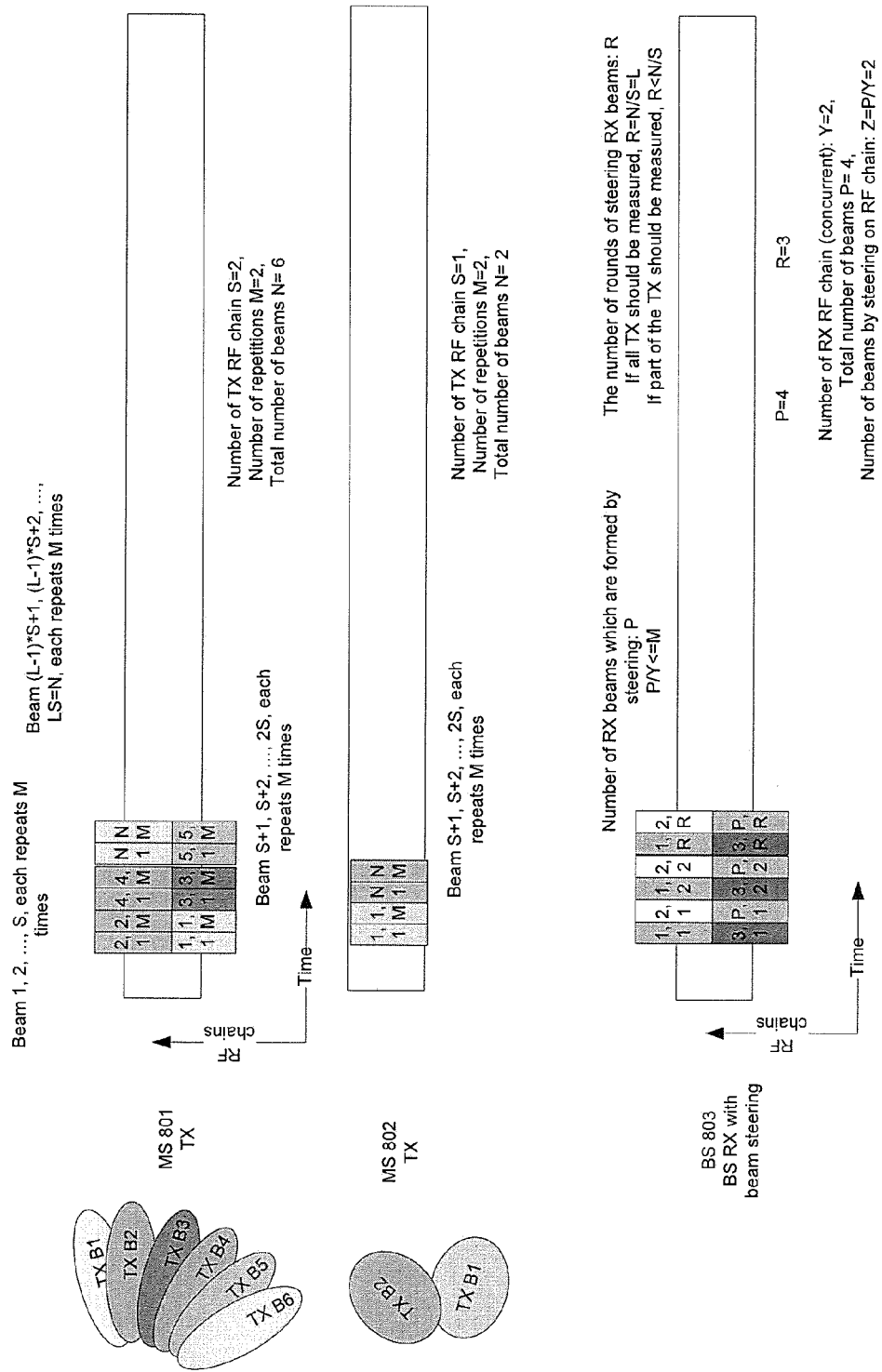

FIG. 8 illustrates different mobile stations flexibly using different configurations for the random access signal, according to another embodiment of this disclosure. The configurations illustrated in FIG. 8 are for illustration only. Other configurations could be used without departing from the scope of this disclosure.

FIG. 8 includes a plurality of mobile stations 801, 802 in communication with a base station 803. In contrast to base station 703 in FIG. 7, which includes only one RF chain, base station 803 includes multiple RF chains. Base station 803 informs mobile stations 801, 802 about BS RX beam forming at each RF chain. As shown in FIG. 8, S indicates the number of TX RF chains, N indicates the total number of beams at each mobile station, and M indicates the number of repetitions. P indicates the number of RX beams that are formed by steering, R indicates the number of rounds of steering the RX beams, and Z indicates the number of beams by steering on the RF chain. In FIG. 8, Z=2, and R=3.

If P (the number of RX beams that are formed by steering) is known at the TX, then the TX can determine M (the number of repetitions) as M=P. The number P may be signaled to the TX side, or derived, or preconfigured. The TX side's information about the number (N/S) of TX transmissions in time can be used for the RX side to determine R (the number of rounds of steering RX beams). Here, R=N/S. The number N/S may be signaled to the RX side, or derived, or preconfigured. Alternatively, R (the number of rounds of steering RX beams) can be configured. The number R can be sent to the TX. Then the TX can determine how many beams to use for TX. The total beams N used at TX should satisfy N/S<=R.

For MS 801, M=Z=2. MS 801 has 6 beams and each is repeated twice. For MS 802, M=2, N=2.

In an embodiment, the base station can hold the BS RX beams in a certain direction to receive the random access signal while the MS TX beams are steered to different directions. Then the BS RX beams can move to another direction and hold, while the steering of the MS TX beams is repeated.

The base station sends the information about its configuration on BS RX beams to receive the random access signal to the mobile station, e.g., in SIB2. The information can include, e.g., the information shown in Table 5.

TABLE 5

An example of the information the BS sends to the MS about BS RX beams to receive random access signal

| Information | Notes |
|---|---|
| 1. Number of BS RX beams that are formed by steering (P) | MS repeats the random access signal M times (M should be at least P) |
| 2. Max Number of MS TX beams at each RF chain allowed in the duration that the BS RX holds one of its beams where the MS TX beams are formed by steering (R) | For MS TX, the number of the beams that can be formed by steering at each RF chain should be no greater than R |
| 3. Timing information of the MS TX beams: The duration of each MS TX beam for one repetition (t_TX); | The duration can be, e.g., in the unit of symbols |
| 4. Or timing information: the duration of BS RX holding one beam (D) | The duration can be, e.g., in the unit of symbols. D = R*t_TX, where R is the number of the MS TX beams that an MS steers at each RF chain |

Note:
the information can include any two items from items 2, 3, 4 above, because the remaining item can be derived from the two items included.

The information can be also sent in other formats with alternative interpretations. For example, the information can include the requirements to the mobile station, rather than the base station's RX beam capability, such as shown in Table 6.

TABLE 6

An example of the information the BS sends to the MS about MS TX beams to send random access signal

| Information | Notes |
|---|---|
| 1. Number of repetitions of MS random access signal (M), or Number of rounds that the MS TX beams steer | MS repeats the random access signal M times |
| 2. Max Number of MS TX beams at each RF chain allowed in the duration that the BS RX holds one of its beams where the MS TX beams are formed by steering (R) | For MS TX, the number of the beams that can be formed by steering at each RF chain should be no greater than R |
| 3. Timing information of the MS TX beams: The duration of each MS TX beam for one repetition (t_TX); | The duration can be, e.g., in the unit of symbols |
| 4. Or timing information: the duration of R MS TX beams (R*t_TX) | The duration can be, e.g., in the unit of symbols |

Note:
the information can include any two items from items 2, 3, 4 above, because the remaining item can be derived from the two items included.

The mobile station can then determine the number of MS TX beams (e.g., the good beams that can receive the downlink in good quality) and beam width (e.g., narrow or wide, etc.). Based on the configuration of the BS RX beams to receive the random access, the mobile station can determine how to transmit the random access signal. The mobile station can make different choices flexibly based on its own situation, as long as the requirements are met. An example in shown in FIG. 9.

Figure 9:
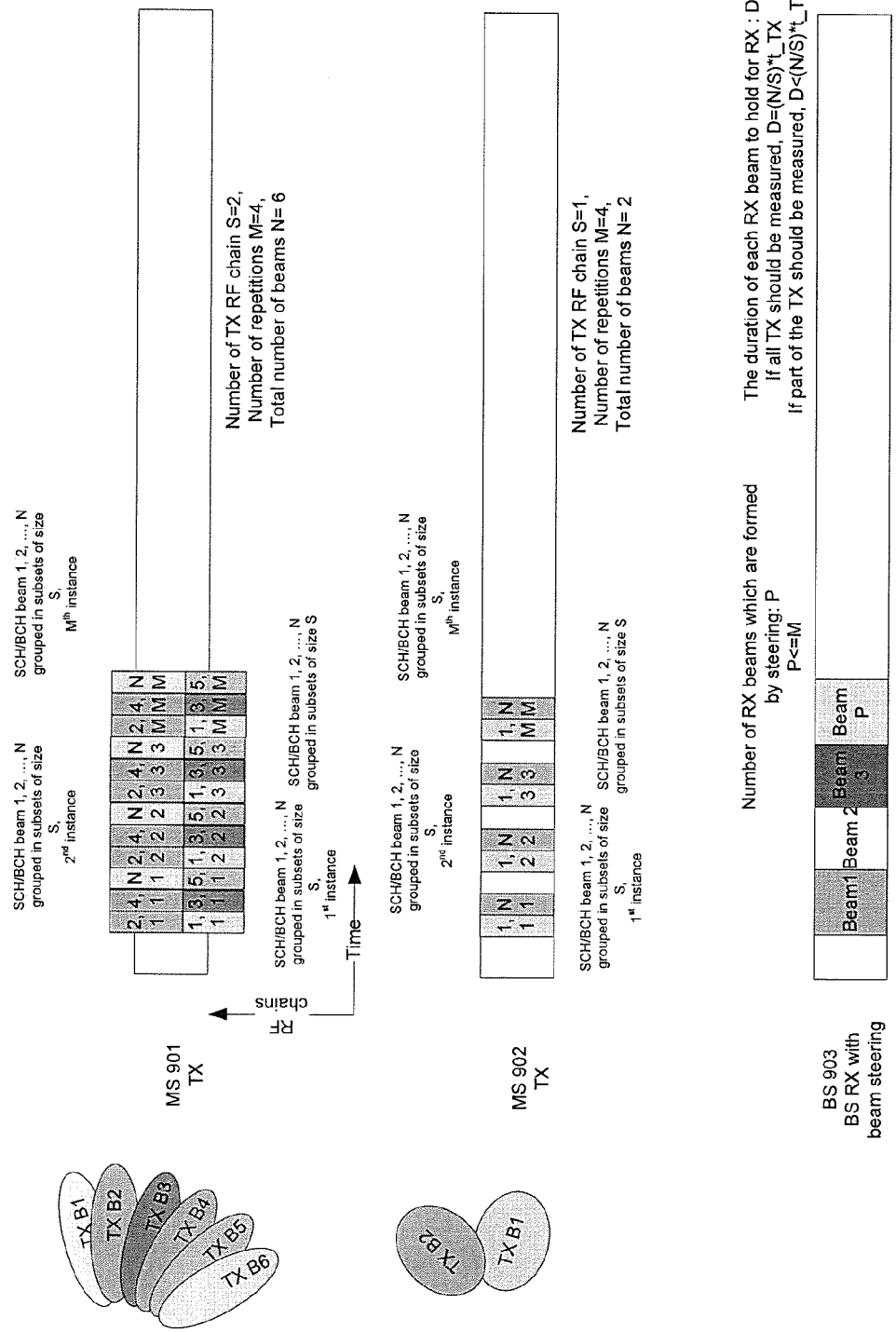

FIG. 9 illustrates different mobile stations flexibly using different configurations for the random access signal, according to yet another embodiment of this disclosure. The configurations illustrated in FIG. 9 are for illustration only. Other configurations could be used without departing from the scope of this disclosure.

FIG. 9 includes a plurality of mobile stations 901, 902 in communication with a base station 903. Base station 903 informs mobile stations 901, 902 about BS RX beam forming. In FIG. 9, S indicates the number of TX RF chains, N indicates the total number of beams at each mobile station, and M indicates the number of repetitions. P indicates the number of RX beams that are formed by steering, and D indicates the duration for each RX beam to hold. In FIG. 9, P=4, R=3.

If P (the number of RX beams that are formed by steering) is known at the TX, then the TX can determine M (the number of repetitions) as M=P. The number P may be signaled to the TX side, or derived, or preconfigured. The TX side's information about the number (N/S) of TX transmissions in time can be used for the RX side to determine D (the duration for each RX beam to hold for RX). Here, D=(N/S)*t_TX where t_TX is the TX duration of each TX beam for one instance. If there are multiple (N/S) values, then D should be determined by the maximum of all the (N/S) values. The duration D may be signaled to the RX side, or derived, or preconfigured. Alternatively, D (the RX beam holding time) can be configured, and information about D can be sent to the TX side. The value of t_TX (the TX duration of each TX beam for one instance) can be configured. Then the TX can determine how many beams to use for TX.

In FIG. 9, MS 901 has enough power and MS 901 does not have links with very high signal strength based on the downlink measurement. Thus, MS 901 determines to use narrow TX beams. If MS 901 determines to use 2 RF chains, then the maximum number of beams it can use is 3*2=6 beams, each chain with 3 beams because R=3.

MS 902 finds two strong links or two strong directions at the downlink. MS 902 uses these two strong directions for random access. MS 902 can use one RF chain, and steer the beams. Since MS 902 only uses two beams, at the third beam slot of each duration D, there can be reduced interference to MS 901's link to the base station. MS 902 can also just use two narrow beams instead of two wide beams. MS 901 and MS 902 each repeat the signal at each direction or each beam four times.

In an embodiment, the base station can hold the BS RX beams in a certain direction to receive the random access signal while the MS TX beams are steered to different directions. Then the BS RX beams can move to another direction and hold while the steering of the MS TX beams is repeated. The BS RX beams can use multiple RF chains, which can form beams concurrently. In such a case, the number of BS RX beams for each chain can be reduced.

The base station sends the information about its configuration on BS RX beams to receive the random access signal to the mobile station, e.g., in SIB2. The information can include, e.g., the information shown in Table 7.

TABLE 7

An example of the information the BS sends to the MS about BS RX beams to receive random access signal

| Information | Notes |
| --- | --- |
| 1. Number of BS RX beams that are formed by steering per RF chain (Z) | MS repeats the random access signal M times (M should be at least Z) |
| 2. Max Number of MS TX beams at each RF chain allowed in the duration that the BS RX holds one of its beams where the MS TX beams are formed by steering (R) | For MS TX, the number of the beams that can be formed by steering at each RF chain should be no greater than R |
| 3. Timing information of the MS TX beams: The duration of each MS TX beam for one repetition (t_TX); | The duration can be, e.g., in the unit of symbols |
| 4. Or timing information: the duration of BS RX holding one beam (D) | The duration can be, e.g., in the unit of symbols. D = R * t_TX, where R is the number of the MS TX beams that an MS steers at each RF chain |

Note:
the information can include any two items from items 2, 3, 4 above, because the remaining item can be derived from the two items included.

The information can be also sent in other formats with alternative interpretations. For example, the information can include the requirements to the mobile station, rather than the base station's RX beam capability, such as shown in Table 8.

TABLE 8

An example of the information the BS sends to the MS about MS TX beams to send random access signal

| Information | Notes |
| --- | --- |
| 1. Number of repetitions of MS random access signal (M), or Number of rounds that the MS TX beams steer | MS repeats the random access signal M times |
| 2. Max Number of MS TX beams at each RF chain allowed in the duration that the BS RX holds one of its beams where the MS TX beams are formed by steering (R) | For MS TX, the number of the beams that can be formed by steering at each RF chain should be no greater than R |
| 3. Timing information of the MS TX beams: The duration of each MS TX beam for one repetition (t_TX); | The duration can be, E.g., in the unit of symbols |
| 4. Or Timing information: the duration of R MS TX beams (R*t_TX) | The duration can be, E.g., in the unit of symbols |

Note:
the information can include any two items from items 2, 3, 4 above, because the remaining item can be derived from the two items included.

The mobile station can then determine the number of MS TX beams (e.g., the good beams that can receive the downlink in good quality) and beam width (e.g., narrow or wide, etc.). Based on the configuration of the BS RX beams to receive the random access, the mobile station can determine how to transmit the random access signal. The mobile station can make different choices flexibly based on its own situation, as long as the requirements are met. An example is shown in FIG. 10.

Figure 10:
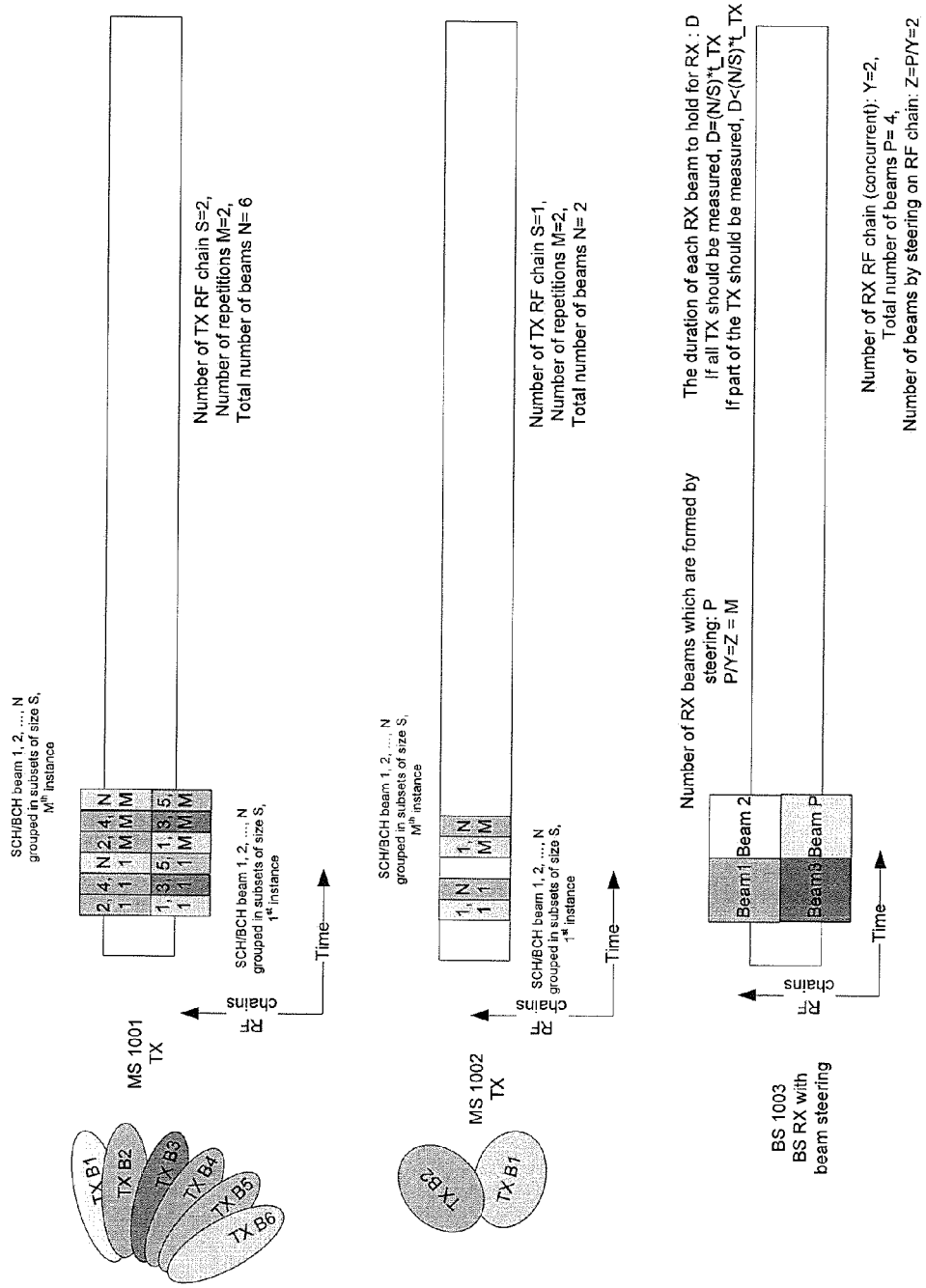

FIG. 10 illustrates different mobile stations flexibly using different configurations for the random access signal, according to still another embodiment of this disclosure. The configurations illustrated in FIG. 10 are for illustration only. Other configurations could be used without departing from the scope of this disclosure.

duration of each TX beam for one instance) can be configured. Then the TX can determine how many beams to use for TX.

The advantage of the embodiments in FIGS. 7 through 10 is that they can provide flexibility to mobile stations with different conditions and capabilities.

In an embodiment, the broadcast channel, e.g., in system information block (SIB), can include the information, which can be a combination of the information in previous embodiments, e.g., by including a mode indication. The mode indication indicates whether the mobile station holds the beam while the base station steers the beam, or vice versa. For example, the information in the broadcast channel can include the information in Table 9.

TABLE 9

An example of the information the BS sends to the mobile station about MS TX beams to send random access signal

| Information | Notes |
| --- | --- |
| Number of MS TX beams in one round of steering | Maximum number of MS TX beams in one round of steering. MS should not use more TX beams than this. |
| Number of transmissions on each beam | The transmissions on each MS TX beam. Each transmission can include one transmission of the preamble of random access, MS TX beam identifier, MS identification. |
| Modes of transmissions:<br>'0' means mode 1<br>'1' means mode 2 | Mode 1: The base station can steer the BS RX beams to receive the random access signal. MS TX beam can hold for a certain direction while the BS RX beams are steered. Then MS TX beam moves to next direction and holds, while the steering of the BS RX beams is repeated.<br>Mode 2: The base station can hold the BS RX beams for a certain direction to receive the random access signal while the MS TX beams are steered to different directions. Then the BS RX can move to another direction while the steering of the MS TX beams is repeated. |
| Timing information for mode 1 | For mode 1, the total time of the BS RX steering and the number of the BS RX beams, or the time of the BS RX steering on one beam |
| Timing information for mode 2 | For mode 2, the time of the BS RX holding one beam |

FIG. 10 includes a plurality of mobile stations 1001, 1002 in communication with a base station 1003. Base station 1003 informs mobile stations 1001, 1002 about BS RX beam forming at each RF chain. In FIG. 10, S indicates the number of TX RF chains, N indicates the total number of beams at each mobile station, and M indicates the number of repetitions. P indicates the number of RX beams that are formed by steering, and D indicates the duration for each RX beam to hold. Y indicates the number of concurrent RX RF chains, and Z indicates the number of beams by steering on the RF chain. In FIG. 10, Z=2 and R=3. For MS 1001, M=Z=2. MS 1001 has 6 beams and each is repeated twice. For MS 1002, M=2 and N=2.

If Z (the number of RX beams per RF chain that are formed by steering) is known at the TX, then the TX can determine M (the number of repetitions) as M=Z. The number Z may be signaled to the TX side, or derived, or preconfigured. The TX side's information about the number (N/S) of TX transmissions in time can be used for the RX side to determine D (the duration of each RX beam to hold for RX). Here, D=(N/S)*t_TX, where t_TX is the TX duration of each TX beam for one instance. Duration D may be signaled to the RX side, or derived, or preconfigured. Alternatively, D (the RX beam holding time) can be configured, and information about D can be sent to the TX side. The value of t_TX (the TX The mobile station may have different numbers of TX beams. For example, some mobile stations may use two TX beams to transmit, and some mobile stations may use four TX beams to transmit. To ensure that the base station does not miss the mobile station transmission, the base station can monitor the random access channel for the time duration needed for receiving the beams from the mobile station with the maximum number of MS TX beams. For example, the base station can monitor the random access channel for the time duration needed for receiving the beams from the mobile station that uses four TX beams.

In an embodiment, the mobile station can send the information at each TX beam from the mobile station, or the random access signal can include information such as the preamble for random access, the mobile station TX beam identifier, and the like.

In an embodiment, the base station can keep track of the BS RX beams used for receiving successful random access messages from different mobile stations. When the mobile stations are in an idle mode, the mobile stations initiate a random access procedure to transition to a connected state. The base station can facilitate this transition by varying the frequency at which different BS RX beams are deployed. In particular, the base station can receive more often in RX directions that have been used more often in the past.

In an embodiment, the base station can configure its BS RX beams to receive the random access signal from the mobile stations. The BS RX beams that receive the random access signal can have the same or different durations. One or more of the BS RX beams can have a longer duration. For example, if based on historical data, it is determined that a BS RX beam direction is more likely to receive random access signals from more mobile stations, then that BS RX beam can be configured to have a longer duration to listen for mobile station random access signals.

The pattern of the BS RX beams and their durations can be sent to the mobile stations. The mobile stations can then flexibly determine the transmitting scheme for random access signaling. If the base station listens in certain directions for a longer time, then a mobile station can randomize or have a certain amount of freedom to send its random access signaling, as long as the mobile station meets its required number of transmission times. This can help reduce the likelihood of collisions of mobile stations' random access along a BS RX beam direction, where a larger number of mobile stations are found.

For example, in Mode 1 (as described in Table 9), the base station can steer the BS RX beams to receive the random access signal. The MS TX beam can hold for a certain direction while the BS RX beams are steered. Then the MS TX beam moves to the next direction and holds, while the steering of the BS RX beams is repeated. The information of the BS RX beams for Mode 1 can include, e.g., the information in Table 10.

TABLE 10

An example of information of the BS RX beams in Mode 1

Information of the beams
for mode 1 can include:

| | |
|---|---|
| The number of BS RX beams | P |
| The number of rounds of BS RX steering | R |
| The time of the BS RX steering on one beam | t_RX |
| The number RX beam times for one beam to hold (default value: 1) | m_1, m_2, ..., m_P. BS RX beam i holds for a duration of m_i* t_RX |

As another example, the information of the BS RX beams for Mode 1 can include the information in Table 11.

TABLE 11

Another example of information of the BS RX beams for Mode 1

Information of the beams for mode 1

| | |
|---|---|
| The number of BS RX beams | P |
| The number of rounds of BS RX steering | R |
| The time of the BS RX steering on one beam | t_RX |
| The number of the BS RX beams whose RX beam times for one beam to hold is greater than 1 | Q |
| For q=1,2,...,Q, The index (i_q) of the BS RX beam q and its corresponding number (m_q) of the RX beam times for one beam to hold, which is greater than 1 | (i_1, m_1), (i_2, m_2), ..., (i_Q, m_Q). BS RX beam i_q holds for a duration of m_q* t_RX, m_q>1, q=1,2,...,Q |

In Mode 2 (as described in Table 9), the base station can hold the BS RX beams for a certain direction to receive the random access signal, while the MS TX beams are steered to different directions. Then the BS RX beam can move to another direction and hold, while the steering of the MS TX beams is repeated. The information of the BS RX beams for Mode 2 can include, e.g., the information in Table 12.

TABLE 10

An example of information of the BS RX beams in Mode 2

Information for mode 2 can include:

| | |
|---|---|
| The number of BS RX beams | P |
| The time of the BS RX holding one beam | t_RX_1 t_RX_2, ... t_RX_P (can have the units such as symbols, etc.) |
| The duration of each MS TX beam for one repetition (optional, may or may not be needed) | t_TX |

The maximum number of MS TX beams at each RF chain allowed during the time period that the base station RX holds one of its beams where the MS TX beams are formed by steering should be no greater than t_RX_i/t_TX, for each i=1, 2, ..., P. In other words, for MS TX beams, the number of the beams that can be formed by steering at each RF chain should be no greater than t_RX_i/t_TX, for each i=1, 2, ..., P.

It is noted that not all of the information of the timing may be represented as an absolute value. If there is a limited number of patterns of BS RX beams and their durations in the time domain, the beams can be coded, e.g., by using the indices of the patterns. The patterns can be preconfigured and pre-known at the mobile stations. Thus, the base station only sends the pattern index to the mobile station.

Figure 11:
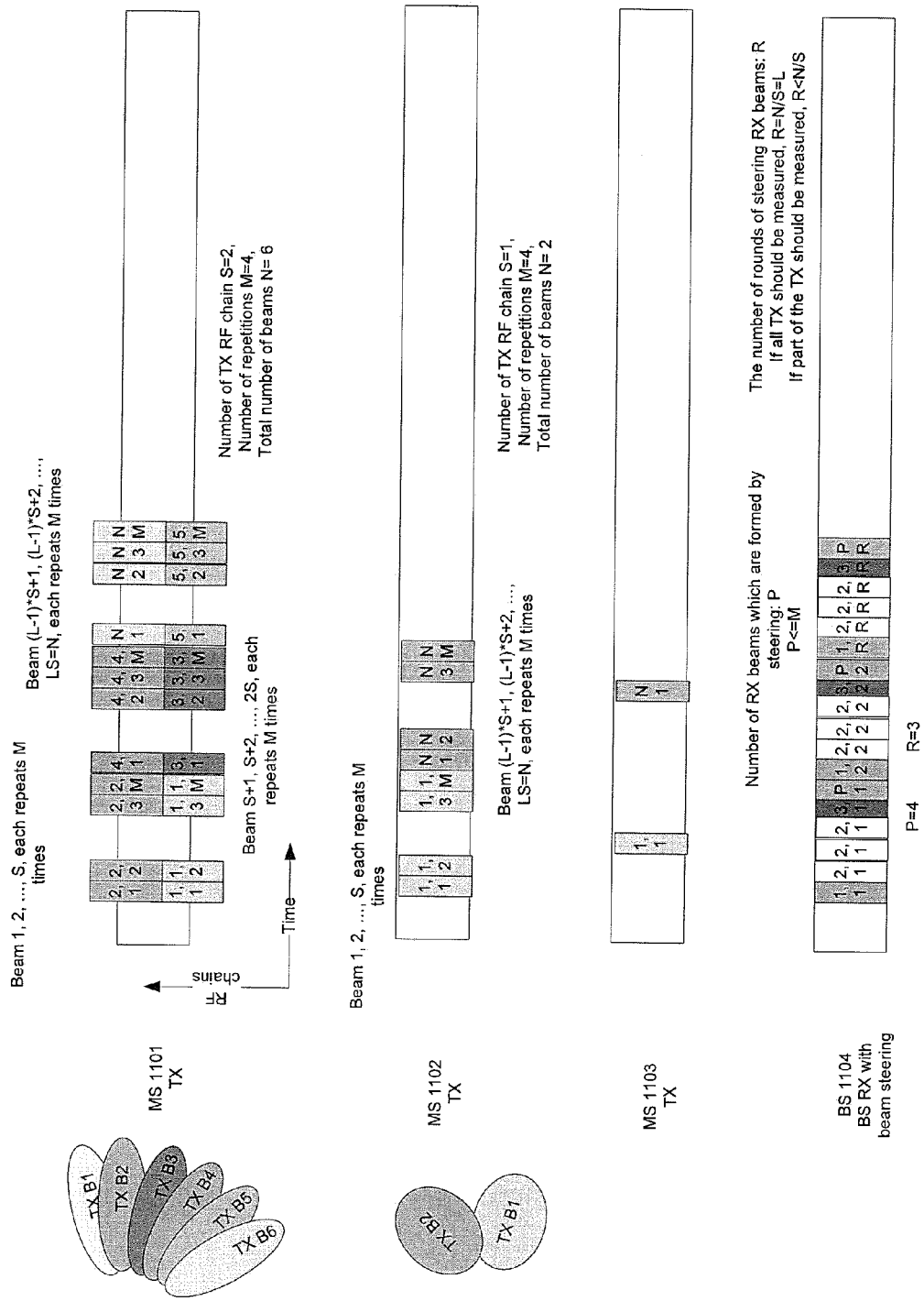
FIGS. 11 and 12 illustrate examples of variable duration for each base station receive beam to receive a random access signal, according to embodiments of this disclosure.
Figure 12:
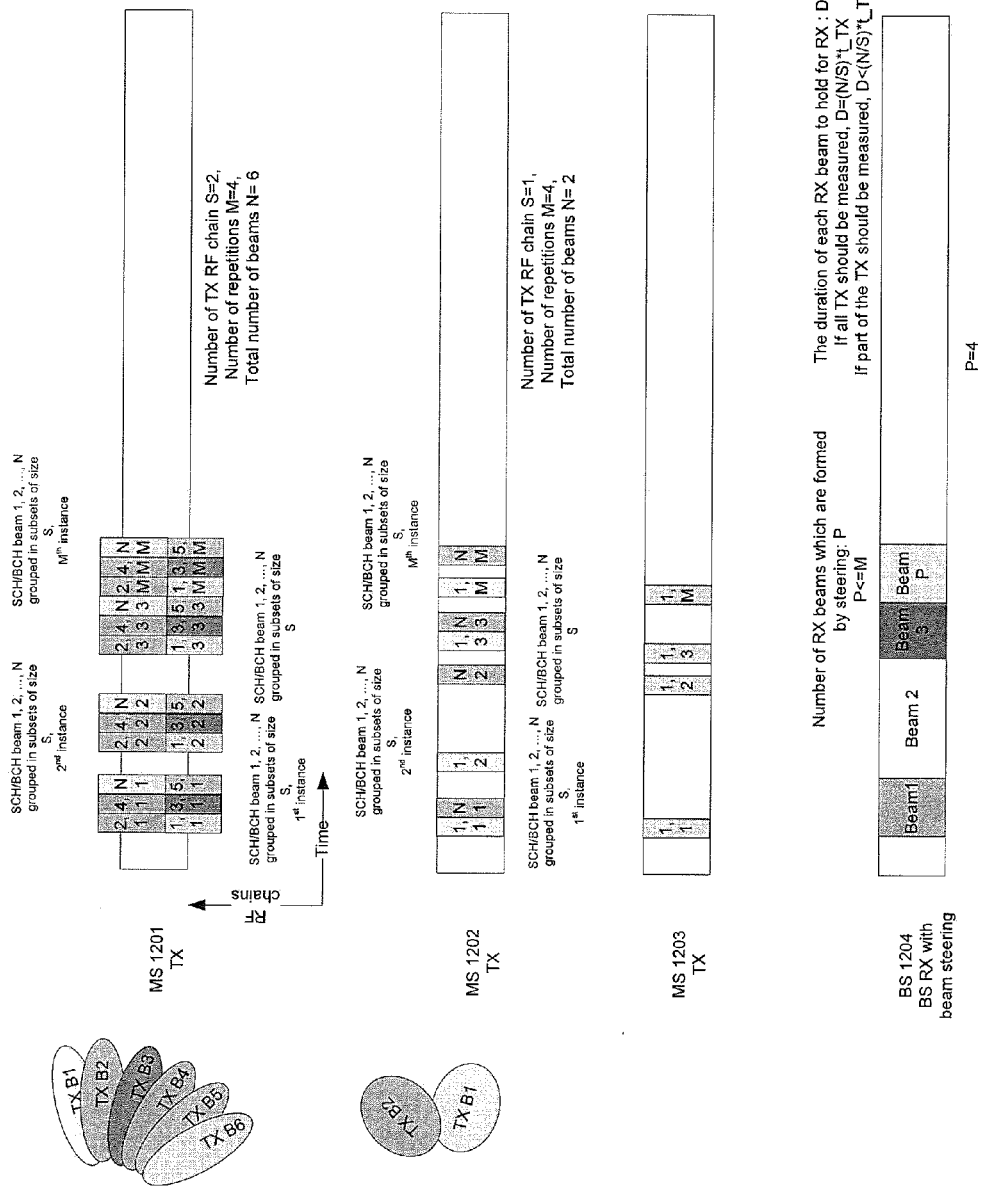

In an embodiment, the mobile station can cache the good BS RX beams to receive its random access signal or other uplink signal. Then, when the mobile station resumes from an idle state or off state, the mobile station performs a random access procedure. The random access procedure can then use the cached information. From the cached information, the mobile station can determine the best or a good BS RX and MS TX beam or beams. Then, from the system information (e.g., from the SIB), the mobile station can determine the pattern of the BS RX beams for random access reception. The mobile station can then determine when to transmit which TX beam. For example, the mobile station may not transmit all the TX beams; rather, the mobile station can transmit the cached good TX beam or beams, which correspond to the good BS RX beams. This can save energy at the mobile station, because it reduces the amount of energy used to transmit all of the TX beams. FIG. 11 shows an example for Mode 1, and FIG. 12 shows an example for Mode 2 (as described in Table 9).

FIG. 11 illustrates an example of variable duration for each BS RX beam to receive a random access signal, according to an embodiment of this disclosure. The embodiment illustrated in FIG. 11 is for illustration only. Other embodiments could be used without departing from the scope of this disclosure.

FIG. 11 includes a plurality of mobile stations 1101-1103 in communication with a base station 1104. The BS RX beam 2 is active for a longer time. The TX of MS 1101 can have its repetitions scheduled in a flexible way, as long as one of the repetitions occurs during the time duration of BS RX beam 2, and one of the repetitions occurs during the time duration of BS RX beam 1,3,4, respectively. Since BS RX beam 2 has a longer duration, there can be nothing transmitting from MS 1101 during the time that BS RX beam 2 is active, other than just one repetition being transmitted. Similar scenarios can be described for MS 1102 and MS 1103.

It is assumed that MS 1103 has cached information that beam combinations {MS TX1, BS RX2} and {MS TX2, BS RX3} are good combinations. Then, MS 1103 can send beam MS TX1 during any time that beam BS RX2 is active. MS 1103 can send beam MS TX2 during the time that beam BS RX3 is active. MS 1103 does not need to send all the beams or repeat them.

FIG. 12 illustrates an example of variable duration for each BS RX beam to receive a random access signal, according to another embodiment of this disclosure. The embodiment illustrated in FIG. 12 is for illustration only. Other embodiments could be used without departing from the scope of this disclosure.

FIG. 12 includes a plurality of mobile stations 1201-1203 in communication with a base station 1204. The BS RX beam 2 has a longer duration. It provides more flexibility for mobile stations to schedule their TX beams. As shown in FIG. 12, during the time of the BS RX beam 2 being active, mobile stations 1201-1203 can have some time during which the mobile stations are not transmitting anything. This can reduce the chance of random access collision if the direction of BS RX beam 2 includes more mobile stations.

Figure 13:
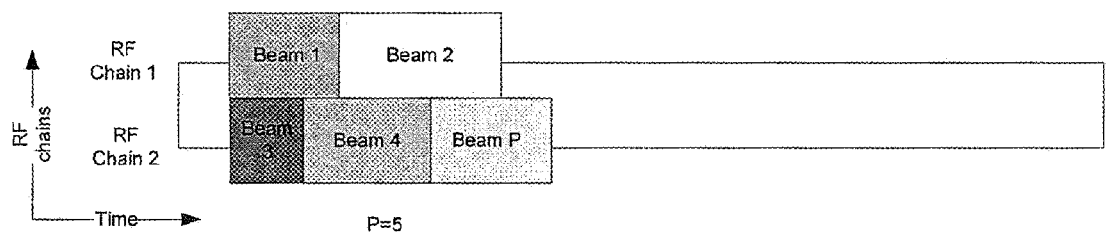
FIG. 13 illustrates an example of variable beams with different RF chains, according to an embodiment of this disclosure.

FIG. 13 illustrates an example of variable beams with different RF chains, according to an embodiment of this disclosure. The embodiment illustrated in FIG. 13 is for illustration only. Other embodiments could be used without departing from the scope of this disclosure.

The BS RX beams to receive the random access signal can have variable duration for each RF chain. Each RF chain can have a different number of BS RX beams to receive the random access signal. The pattern of the BS RX beams on different RF chains can be sent to the mobile station, so that mobile station can determine a good scheme to transmit the random access signal. In FIG. 13, there are two beams on RF chain 1 and three beams on RF chain 2. Each beam may have a different duration.

In an embodiment, the base station can configure its BS RX beams to receive the mobile station random access signal. Thus, the content of the information (e.g., the information in Tables 1~10) can be changed. For example, if there is an in-band backhaul, and fewer resources will be allocated for mobile access, then the number of BS RX beams or RF chains to receive the mobile station random access signal can be reduced; thus, an update of the information (e.g., in the SIB) can be changed. Such an update can be transmitted via the SIB or via a different message from the SIB. As another example, if the base station has a smaller coverage area (e.g., a femto base station), the base station can reduce the number of the BS RX beams while using wider beams; then the content of the information in Tables 1~10 can be different from base station to base station.

In an embodiment, the mobile station can randomize its repetitions of the TX beams in Mode 1 within the BS RX beam receiving time, as long as each repetition of the TX beam can be received by each one of the RX beams. The mobile station can have feasible patterns of its transmission beams (e.g., with a randomized waiting time between the repetitions of the beam) as long as it is within the BS RX beam receiving time, and as long as each repetition of the TX beams can be received by each one of the RX beams.

There can be one or multiple feasible patterns of the transmission beam repetitions. The mobile station can select one pattern from all of the feasible patterns. The selected pattern index can be a hash function of system parameters, such as the MS ID, number of the units of the beam time duration, per RX beam configuration index, beam ID, and the like.

There can also be an unlimited number of feasible patterns for the mobile station TX beams repetitions. For example, one repetition of one TX beam can be sent at any time during a time interval that the base station is receiving on one of its RX beams. If the time interval duration that the base station is receiving using one of its RX beams is greater than the actual transmitting time needed for one repetition of one TX beam, then the TX beam's repetition can be sent randomly at any time as long as it is within the receiving time interval. (This assumes that the timing advance to adjust the TX and RX timing alignment has already been addressed.)

If the feasible starting time for the TX beam's repetition is in time interval [a,b], then one representation for the mobile station's transmitting time for the TX beam's repetition can be x, where x is a random value in interval [a,b]. For example, the randomization can be that x is a uniform random variable in interval [a,b]. The variable x can also be a random variable related to system parameters, such as the MS ID, number of the units of the beam time duration, per RX beam configuration index, beam ID, and the like.

Another method is to quantize the unlimited number of feasible patterns, to make it a limited number of feasible patterns. For example, the interval [a,b] above can be evenly split into Z small intervals, with index 0, 1, 2, . . . , Z−1. The mobile station can have a randomly selected index (e.g., a uniform random variable) of 0, 1, 2, . . . , Z−1. The selected pattern index can be a hash function of system parameters, such as the MS ID, number of the units of the beam time duration, per RX beam configuration index, beam ID, and the like.

For example, in FIG. 11, MS 1101 can have its second repetition of beams 1,2, 3,4,5,6 in any time transmitted, as long as it is received by RX beam 2 at BS 1104. MS 1101 can randomly select when to transmit its second repetition of beams 1,2,3,4,5,6. In FIG. 11, MS 1101 can have two repetitions for MS beams 1,2 first, then have a waiting time, then have another two repetitions for MS beams 1,2. This ensures that each repetition can be received by each one of the RX beams. MS 1101 can have one repetition for MS beams 3,4 first, then have a waiting time, then have another three repetitions for MS beams 3,4. This also ensures that each repetition can be received by each one of the RX beams. These patterns are possible because RX beam 2 has a longer RX time.

In an embodiment, the mobile station can randomize TX beam steering in Mode 2, within the BS RX beam receiving time, as long as each repetition of the TX beam can be received by each one of the RX beams. The mobile station can have feasible patterns of its transmission beams (e.g., with a randomized waiting time between the transmission or steering of the beams, or with a randomized waiting time between the TX beams even within a round of steering the beams) as long as one round of the steering/transmitting time for all the MS TX beams is within one BS RX beam receiving time or holding time, and as long as each transmission of the TX beams can be received by each one of the RX beams.

There can be one or multiple feasible patterns of the transmission beams. The mobile station can select one pattern from all of the feasible patterns. The selected pattern index can be a hash function of system parameters, such as the MS ID, number of the units of the beam time duration, per RX beam configuration index, beam ID, and the like.

There can also be an unlimited number of feasible patterns for the mobile station TX beams. For example, one round of the steering of all the TX beams of the mobile station can be sent any time in a time interval that the base station is receiving on or holding one of its RX beams. If the time interval duration that the base station is receiving on one of its RX beams is greater than the actual transmitting time needed for one round of all TX beams of the mobile station, then the TX beam's repetition can be sent randomly at any time as long as it is within the receiving time interval. (This assumes that the timing advance to adjust the TX and RX timing alignment has already been addressed.)

If the feasible starting time for a round of TX beams of the mobile station is in time interval [a,b], then one representation for the mobile station's transmitting time for a round of TX beams can be x, where x is a random value in interval [a,b]. For example, the randomization can be that x is uniform random variable in interval [a,b]. The variable x can also be a random variable related to system parameters, such as the MS ID, number of the units of the beam time duration, per RX beam configuration index, beam ID, and the like.

Another method is to quantize the unlimited number of feasible patterns, to make it a limited number of feasible patterns. For example, the interval [a,b] above can be evenly split into Z small intervals, with index 0, 1, 2, . . . , Z−1. The mobile station can have a randomly selected index (e.g., uniform random variable) of 0, 1, 2, . . . , Z−1. The selected pattern index can be a hash function of system parameters, such as the MS ID, number of the units of the beam time duration, per RX beam configuration index, beam ID, and the like.

For example, in FIG. 12, each mobile station can have its second round of beam steering and transmitting in any time, as long as all of the beams are received by RX beam 2 at BS 1204. Each mobile station can randomly select when to transmit its second round of beam steering for all the beams. In FIG. 12, MS 1201 can have its second round of beam steering randomly within BS TX beam 2's holding time. MS 1202 can have its second round of beam steering randomly within the BS TX beam. Each mobile station can also randomize the time between the beams within a round of the steering or transmitting. For example, MS 1202 can randomize the time between beam 1 and beam N in the second round of steering, as shown in FIG. 12. These patterns are possible because RX beam 2 has a longer RX time.

In an embodiment, the random access slot allocation for network entry and dedicated random access may need to be separately provisioned. The hash function for the mobile station to pick a random access slot within the duration of a base station's particular RX beam receiving time can depend on the random access allocation for the duration of the base station's particular RX beam receiving time. The base station or the network can configure the randomness for the mobile station and tell the mobile station to follow the configuration in connected mode when the mobile station is randomly accessing to the neighboring cells or target cells. An alternative is that the randomization algorithm can be predetermined or predefined; hence both mobile station and base station use the same algorithm.

In an embodiment, during the initial network entry (from power on, to get into the network), or from the idle state to the connected state, the mobile station can start with the synchronization channel (SCH) acquisition. The base station can send the SCH with a predefined number of beams. The SCH may carry information about the physical broadcast channel (PBCH), such as how many beams are used for the PBCH. The mobile station can acquire the PBCH. The PBCH can be decoded by the mobile station after the mobile station receives the CRS (cell specific reference signal). The base station sends the CRS using one or more resources (e.g., with the same beams that the SCH or PBCH are using). The mobile station decodes the PBCH. The PBCH may carry the information about the PDCCH, e.g., how many beams the PDCCH is using.

The mobile station can measure the SCH beams. The mobile station can determine which RX beams are good for receiving SCH beams. If the SCH beams and PBCH beams are using the same physical beams (e.g., same direction, same beam width, and the like), then the mobile station can use the good RX beams to receive the PBCH, while not using the bad RX beams to receive the PBCH, to reduce the energy consumption in the mobile station. The good RX beams and the bad RX beams can be determined when one or more metrics (e.g., the signal to noise ratio (SNR), signal strength, signal to interference ratio (SIR), signal to interference and noise ratio (SINR), reference signal received power, reference signal received quality, and the like) are beyond a certain threshold, or below a certain threshold, respectively. The mobile station can also measure the beams via CRS.

In an embodiment, the base station sends the PDCCH to the mobile station. The PDCCH can carry information about the resource allocation for the system information blocks (SIB)s, which is important system information, typically broadcast by the base station. The PDCCH beams can be sent over the same beams as the beams for the SCH or PBCH. After the mobile station decodes the PDCCH, the mobile station can know where the SIBs (e.g., SIB1, SIB2) are located. The mobile station can measure the PDCCH beams (e.g., via the CRS). The mobile station can know which RX beams are good for receiving PBCH beams. If the PBCH beams and PDCCH beams are using the same physical beams (e.g., same direction, same beam width, etc.), then the mobile station can use the good RX beams for receiving the PBCH to receive the PDCCH, while not using the bad RX beams to receive the PDCCH. This can reduce energy consumption in the mobile station.

In an embodiment, the base station can send SIBs to the mobile stations, e.g., over wide beams. The SIBs beams can be sent over the same beams as the beams for the PDCCH, the SCH, or the PBCH. Some of the SIBs may include information for the mobile station to send a random access signal or uplink signal. The mobile station can measure the SIB beams, e.g., via the CRS, or via a CSI RS (channel state information reference signal). The mobile station can determine which RX beams are good for receiving SIB beams. If the SIB beams and PDCCH beams use the same physical beams (e.g., same direction, same beam width, and so forth), then the mobile station can use the good RX beams for receiving the PDCCH to receive the SIBs, while not using the bad RX beams to receive the SIBs. This can reduce energy consumption in the mobile station.

In an embodiment, after receiving SIBs that include information for the mobile station to send the random access signal or uplink signal, the mobile station can determine where to send the uplink signal. The mobile station can then start the random access procedure. The mobile station can use the good RX beams to transmit the uplink signal (this can help reduce the energy consumption). Alternatively, the mobile station can use all RX beams to transmit the uplink signal.

The base station can use all of its RX beams to listen to the uplink signals from the mobile station. If the base station steers the RX beams, the mobile station should repeat the uplink signal, e.g., a number of times equal to the number of BS RX beams, so that the base station may receive the mobile station uplink signal. If the base station does not steer the RX beams, but instead, the base station uses all RX beams at once, then the mobile station may not need to repeat the uplink signal. The uplink signal may indicate which BS TX beam is good, e.g., by including the BS TX beam identifier.

Figure 14:
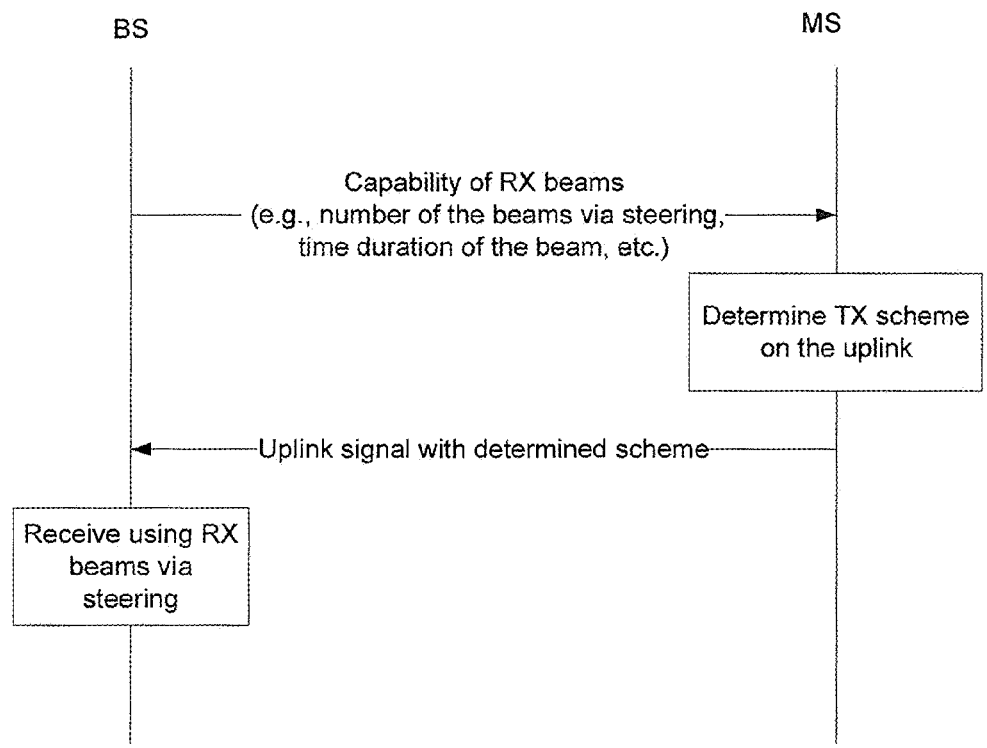
FIGS. 14 and 15 illustrate examples of a base station informing a mobile station of the base station's receive beam capability so that the mobile station can determine a transmission scheme, according to embodiments of this disclosure.

FIG. 14 illustrates an example of a base station informing a mobile station of the base station's receive beam capability so that the mobile station can determine a transmission scheme, according to an embodiment of this disclosure. The embodiment illustrated in FIG. 14 is for illustration only. Other embodiments could be used without departing from the scope of this disclosure.

In FIG. 14, the base station can indicate whether it would use its RX beams in a steering fashion, or whether the RX beams can be formed all at the same time, or how many times the mobile station should be repeating the uplink signaling, etc., by sending the information to the mobile stations. The information may be sent in one of the SIBs, such as the SIB that includes the parameters or information for the random access. For example, the base station can indicate to the mobile stations:

Number of the UL signaling repetition needed: 4
Number of BS RX beams: 4, Method of forming: steering
Number of BS RX beams: 4, Method of forming: all at once
Number of BS RX beams: 4, Method of forming: beam 1-2 steering, beam 3-4 steering, beam 1,3 at the same time, 2,4 at the same time.

The method of forming can be coded, e.g., as '00', '01', '10', and the like.

The mobile station can then send the preambles repeatedly, where the number of repetitions can be the one indicated by the base station, or the number of the BS RX beams that are formed by steering. In an embodiment, the mobile station can determine the number of repetitions for random access preambles in the time domain without the base station explicitly sending the message or signal to the mobile station. Rather, the information can be implicit, e.g., by a predefined value, a preconfigured value, or based on the transmission scheme of the base station wide beams for the sync, PBCH, SIB, and the like. The predefined value or preconfigured value can be the number of the BS TX beams for wide beams such as sync, PBCH, SIB, etc., where these beams are formed by steering.

In another embodiment, in the sync channel, the base station broadcasts the number of the BS TX beams that are formed via steering, for wide beams such as the PBCH. Then the mobile station can determine the number of the repetitions of the mobile station random access preambles, which can be the number of BS TX beams that are formed via steering, for wide beams such as the PBCH.

Figure 15:
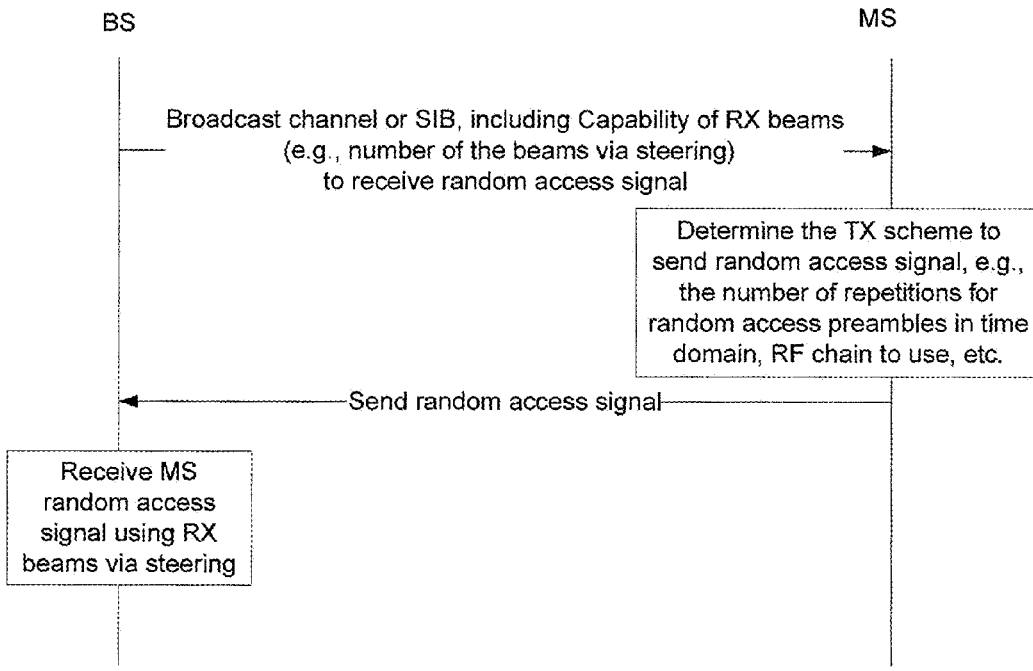

The default value of the number of repetitions of mobile station random access preambles can be the number of BS TX beams for wide beams such as sync, PBCH, SIB, etc., where the beams are formed via steering. For example, if there are four PBCH beams and the beams are formed via steering one after another, then the number of repetitions of mobile station random access preambles can be four. If these four PBCH beams are formed via the method "beam 1-2 steering, beam 3-4 steering, beam 1,3 at the same time (concurrent), 2,4 at the same time (concurrent)", then the number of repetitions of mobile station random access preambles can be two. FIG. 15 illustrates an example of a base station informing a mobile station, in the random access, of the base station's receive beam capability so that the mobile station can determine a transmission scheme, according to an embodiment.

If there is no signaling from the base station to inform the mobile station about the number of repetitions of mobile station random access preambles in the time domain, then the mobile station can take the default value.

In an embodiment, the uplink signal (e.g., the reference signal) or the sounding signal should be repeated for a number of repetitions, where the number of repetitions can be the number of the BS RX beams that would be formed by steering. The base station can inform the mobile station of the number of the repetitions of the sounding signal.

Figure 16:
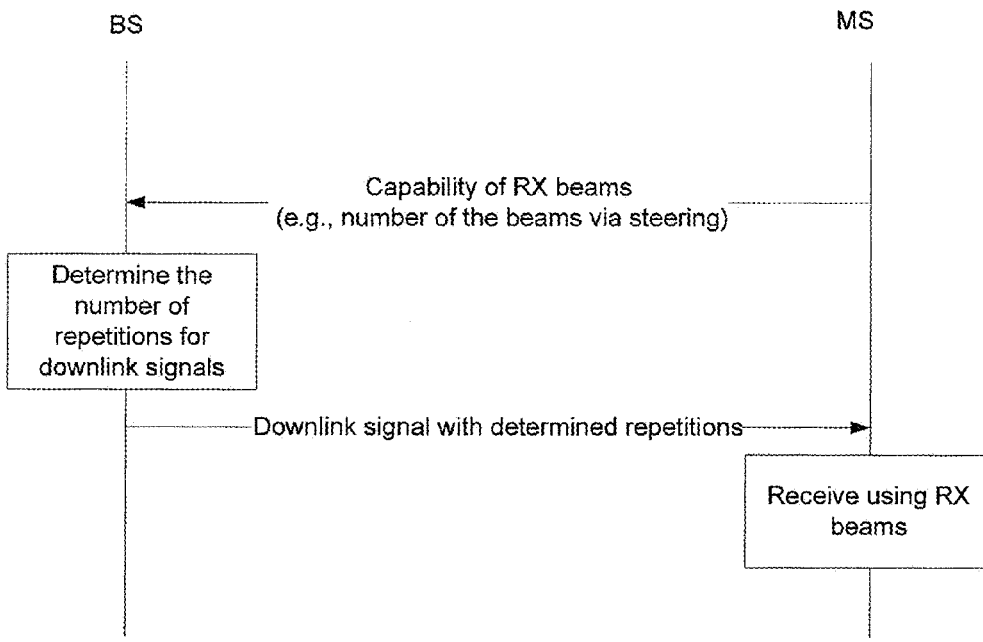
FIG. 16 illustrates an example of a mobile station informing a base station of the mobile station's receive beam capability so that the base station can determine a transmission scheme, according to an embodiment of this disclosure.

In an embodiment, the base station can select the PDCCH beams to send to the mobile station, e.g., based on mobile station's request, or based on the base station's own decisions. If the selection is based on the mobile station's request, the mobile station can use mobile station-selected MS RX beams to receive the PDCCH. This embodiment can reduce the mobile station's energy consumption. It can also reduce the repetition times for the PDCCH. FIG. 16 illustrates such an example. In FIG. 16, a mobile station informs a base station of the mobile station's receive beam capability so that the base station can determine a transmission scheme, according to an embodiment of this disclosure.

The PDCCH beams should be repeated in the time domain if the mobile station uses beam steering at the MS RX side in the time domain. In other words, the MS RX beams are not formed at the same time, rather, are formed at different times. The number of repetitions of the PDCCH in the time domain can be the number of MS RX beams used to receive the PDCCH when the MS RX beams cannot be formed at the same time. For example, if the mobile station has two RX beams to receive the PDCCH, and these two RX beams cannot be formed at the same time (rather, they are formed by steering), then the PDCCH can be repeated twice in the time domain.

For such a scenario, it can be advantageous for the mobile station to inform the base station of its receive beams and whether the receive beams can be formed at the same time or whether these receive beams are steering. The information can be delivered in the mobile station feedback to the base station in the uplink communication, e.g., together with the TX beam reporting. For example, in the random access channel, the mobile station can indicate the number of repetitions for the PDCCH, based on the number of its RX beams if these beams are formed by steering. The number of the repetition can be explicit, or implicit. If there is only one RX beam (e.g., an omni-directional RX beam), then the mobile station does not need to send anything to the base station about its RX beams.

When the base station selects the PDCCH beams to send to the mobile station based on the base station's own decision, since the mobile station does not know which PDCCH beams are selected, the mobile station may use all of its RX beams to receive. The mobile station may also use its good RX beams to receive.

In the PDCCH, the base station can send the information about the follow up PDSCH. The base station can send the PDSCH on the same beam as the PDCCH, and the mobile station can receive the PDSCH on the same RX beams as it receives the PDCCH. The mobile station can send the PUSCH on the same beam as the beams it uses to receive the PDSCH, and the base station can receive the PUSCH using the same RX beams as the ones it uses to receive the PUCCH.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for random access by a mobile station in a wireless network, the method comprising:

receiving, from a base station, a spatial direction of at least one receive beam of the base station and configuration information of at least one transmit beam including a number of repetition of the random access signal, a maximum number of transmit beams that are formed by steering at each radio frequency (RF) chain, and timing information to transmit a random access signal, wherein the timing information includes a duration of each transmit beam or a duration of each transmit beam for one repetition associated with the random access signal to be transmitted to the base station over the at least one transmit beam;

configuring at least one transmit beam for a transmission of the random access signal based on the configuration information and the spatial direction of the at least one receive beam; wherein the at least one transmit beam is selected in accordance with a beam width and a signal strength of the at least one transmit beam; and transmitting the random access signal to the base station on the at least one transmit beam that is configured in accordance with the receive beam configuration information and the spatial direction of the at least one receive beam received from the base station.

2. The method of claim 1, wherein the receive beam configuration information comprises at least one of a time resource or a frequency resource.

3. The method of claim 1, wherein configuring at least one transmit beam for a transmission of the random access signal further comprising:

determining a number of transmit beams, a beam width of the each transmit beam, or a transmission timing of the random access signal to be transmitted on the transmit beam.

4. The method of claim 1, wherein the mobile station randomly selects the transmission timing of the random access signal to be transmitted on the transmit beam.

5. The method of claim 1, further comprises:

holding a first receive beam for a longer time than a second receive beam, wherein the first receive beam provides a higher flexibility in selecting the transmission timing associated with the random access signal to be transmitted on the transmit beam than the second receive beam.

6. An apparatus for use in a mobile station configured for random access in a wireless network, the apparatus comprising:

a processor configured to:
  receive, from a base station, a spatial direction of at least one receive beam of the base station and configuration information of at least one transmit beam including a number of repetition of the random access signal, a maximum number of transmit beams that are formed by steering at each radio frequency (RF) chain, and timing information to transmit a random access signal, wherein the timing information includes a duration of each transmit beam or a duration of each transmit beam for one repetition associated with the random access signal to be transmitted to the base station over the at least one transmit beam;
  configure at least one transmit beam for a transmission of the random access signal based on the configuration information and the spatial direction of the at least one receive beam; wherein the transmit beam is selected in accordance with a beam width and a signal strength of the transmit beam; and
  transmit the random access signal to the base station on the at least one transmit beam that is configured in accordance with the receive beam configuration information and the spatial direction of the at least one receive beam received from the base station.

7. The apparatus of claim 6, wherein the receive beam configuration information comprises at least one of a time resource or a frequency resource.

8. The apparatus of claim 6, wherein the processor configures at least one transmit beam for the transmission of the random access signal by further comprising:

determine a number of transmit beams, a beam width, or a transmission timing of the random access signal to be transmitted on the transmit beam.

9. The apparatus of claim 6, wherein the mobile station is configured to randomly select the transmission timing of the random access signal to be transmitted on the transmit beam.

10. The apparatus of claim 6, wherein the base station is configured to hold a first receive beam for a longer time than a second receive beam, wherein the first receive beam provides a higher flexibility in selecting the transmission timing associated with the random access signal to be transmitted on the transmit beam than the second receive beam.

11. A method for random access by a base station in a wireless network, the method comprising:

transmitting, to a mobile station, a spatial direction of at least one receive beam of the base station and configuration information of at least one transmit beam including a number of repetition of the random access signal, a maximum number of transmit beams that are formed by steering at each radio frequency (RF) chain, and timing information to receive a random access signal, wherein the timing information includes a duration of each transmit beam or a duration of each transmit beam for one repetition associated with the random access signal to be transmitted to the base station over the at least one transmit beam; and receiving the random access signal from the mobile station on the at least one receive beam that is configured in accordance with the transmit beam configuration information received from the mobile station and the spatial direction of the at least one receive beam transmitted from the base station.

12. The method of claim 11, wherein the receive beam configuration information comprises at least one of a time resource or a frequency resource.

13. The method of claim 11, wherein the at least one transmit beam for the transmission of the random access signal is configured by determining at least one of a number of transmit beams, a beam width of the each transmit beam, or a transmission timing of the random access signal to be transmitted on the transmit beam.

14. The method of claim 13, wherein the mobile station randomly selects the transmission timing of the random access signal to be transmitted on the transmit beam.

15. The method of claim 11, further comprises:

holding a first receive beam for a longer time than a second receive beam, wherein the first receive beam provides a higher flexibility in selecting the transmission timing associated with the random access signal to be transmitted on the transmit beam than the second receive beam.

16. An apparatus for use in a base station configured for random access in a wireless network, the apparatus comprising:

a processor configured to:
transmit, to a mobile station, a spatial direction of at least one receive beam of the base station and configuration information of at least one transmit beam including a number of repetition of the random access signal, a maximum number of transmit beams that are formed by steering at each radio frequency (RF) chain, and timing information to receive a random access signal, wherein the timing information includes a duration of each transmit beam or a duration of each transmit beam for one repetition associated with the random access signal to be transmitted to the base station over the at least one transmit beam; and receive the random access signal from the mobile station on the at least one receive beam that is configured in accordance with the transmit beam configuration information received from the mobile station and the spatial direction of the at least one receive beam transmitted from the base station.

17. The apparatus of claim 16, wherein the receive beam configuration information comprises at least one of a time resource or a frequency resource.

18. The apparatus of claim 16, wherein the at least one transmit beam for the transmission of the random access signal is configured by determining at least one of
- a number of transmit beams, a beam width of the each transmit beam, or
- a transmission timing of the random access signal to be transmitted on the transmit beam.

19. The apparatus of claim 18, wherein the mobile station is configured to randomly select the transmission timing of the random access signal to be transmitted on the transmit beam.

20. The apparatus of claim 16, wherein the base station is configured to hold a first receive beam for a longer time than a second receive beam, wherein the first receive beam provides a higher flexibility in selecting the transmission timing associated with the random access signal to be transmitted on the transmit beam than the second receive beam.

* * * * *